(12) United States Patent
Tandon

(10) Patent No.: US 12,134,059 B2
(45) Date of Patent: Nov. 5, 2024

(54) HONEYCOMB FILTER BODIES AND PARTICULATE FILTERS COMPRISING HONEYCOMB FILTER BODIES

(71) Applicant: CORNING INCORPORATED, Corning, NY (US)

(72) Inventor: Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 380 days.

(21) Appl. No.: 17/608,778

(22) PCT Filed: May 1, 2020

(86) PCT No.: PCT/US2020/030899
§ 371 (c)(1),
(2) Date: Nov. 4, 2021

(87) PCT Pub. No.: WO2020/227040
PCT Pub. Date: Nov. 12, 2020

(65) Prior Publication Data
US 2022/0325644 A1 Oct. 13, 2022

Related U.S. Application Data

(60) Provisional application No. 62/845,070, filed on May 8, 2019.

(51) Int. Cl.
*B01D 46/24* (2006.01)
*C04B 38/00* (2006.01)
*F01N 3/022* (2006.01)

(52) U.S. Cl.
CPC ... *B01D 46/24491* (2021.08); *B01D 46/2429* (2013.01); *B01D 46/2474* (2013.01);
(Continued)

(58) Field of Classification Search
CPC .......... B01D 46/24491; B01D 46/2429; B01D 46/2474; B01D 46/2482; B01D 46/2498;
(Continued)

(56) References Cited

U.S. PATENT DOCUMENTS

| 8,293,183 | B2 | 10/2012 | Mizutani et al. |
| 8,444,739 | B2 | 5/2013 | Mizuno et al. |

(Continued)

FOREIGN PATENT DOCUMENTS

| CN | 102481506 A | 5/2012 |
| CN | 103282327 A | 9/2013 |

(Continued)

OTHER PUBLICATIONS

Chinese Patent Application No. 202080034444.0, Office Action dated Jul. 6, 2022, 5 pages (English Translation only), Chinese Patent Office.

(Continued)

*Primary Examiner* — Frank M Lawrence, Jr.
(74) *Attorney, Agent, or Firm* — Matthew J. Mason

(57) ABSTRACT

A honeycomb filter body comprises: a clean filter pressure drop of ($P_1$) and a clean filtration efficiency of ($FE_1$); a porous ceramic honeycomb body comprising a first end, a second end, and a plurality of walls having wall surfaces defining a plurality of inner channels, the porous ceramic honeycomb body comprising a base clean filter pressure drop ($P_0$) and a base clean filtration efficiency ($FE_0$); and a porous inorganic layer disposed on one or more of the wall surfaces of the porous ceramic honeycomb body.

18 Claims, 11 Drawing Sheets

(52) U.S. Cl.
CPC ....... *B01D 46/2482* (2021.08); *F01N 3/0222* (2013.01); *F01N 2330/06* (2013.01); *F01N 2330/60* (2013.01)

(58) Field of Classification Search
CPC .............. F01N 3/0222; F01N 2330/06; F01N 2330/60; C04B 2111/00793; C04B 2111/0081; C04B 35/185; C04B 35/195; C04B 35/478; C04B 35/565; C04B 38/0006
USPC .................................. 55/523, 524; 428/116
See application file for complete search history.

(56) References Cited

U.S. PATENT DOCUMENTS

| | | | |
|---|---|---|---|
| 8,609,032 B2 | 12/2013 | Boger et al. | |
| 8,713,913 B2 | 5/2014 | Wenninger et al. | |
| 8,741,020 B2 | 6/2014 | Kishimoto et al. | |
| 8,889,221 B2 | 11/2014 | Sappok et al. | |
| 9,051,857 B2 | 6/2015 | Dornhaus et al. | |
| 11,883,770 B2 * | 1/2024 | Nakashima | B01D 46/2482 |
| 2010/0126133 A1 | 5/2010 | Fekety et al. | |
| 2012/0058019 A1 | 3/2012 | Mizutani et al. | |
| 2012/0240538 A1 * | 9/2012 | Isoda | B01D 39/2058 55/486 |
| 2012/0317946 A1 | 12/2012 | Miyairi | |
| 2014/0044756 A1 | 2/2014 | Leung et al. | |
| 2016/0166959 A1 | 6/2016 | Cui et al. | |
| 2016/0363019 A1 | 12/2016 | Warner et al. | |
| 2018/0311621 A1 | 11/2018 | Chen et al. | |
| 2019/0301325 A1 * | 10/2019 | Yoshioka | B01J 23/42 |
| 2020/0254435 A1 * | 8/2020 | Wu | B01D 46/2482 |

FOREIGN PATENT DOCUMENTS

| | | |
|---|---|---|
| CN | 103971395 A | 8/2014 |
| CN | 106999953 A | 8/2017 |
| CN | 108290102 A | 7/2018 |
| EP | 2918566 A1 | 9/2015 |
| JP | 2011-194346 A | 10/2011 |
| JP | 2018-533471 A | 11/2018 |
| WO | 2008/136232 A1 | 11/2008 |
| WO | 2018/046383 A1 | 3/2018 |

OTHER PUBLICATIONS

International Search Report and Written Opinion of the International Searching Authority; PCT/US2020/030899; dated Jul. 29, 2020; 15 pages; European Patent Office.

Chinese Patent Application No. 202080034444.0, Office Action, dated Mar. 15, 2023, 3 pages, Chinese Patent Office.

* cited by examiner

US 12,134,059 B2

HONEYCOMB FILTER BODIES AND PARTICULATE FILTERS COMPRISING HONEYCOMB FILTER BODIES

This is a national stage application under 35 U.S.C. § 371 of International Application No. PCT/US2020/030899, filed on May 1, 2020, which claims the benefit of priority under 35 U.S.C. § 119 of U.S. Provisional Application No. 62/845,070 filed on May 8, 2019, the content of which is incorporated herein by reference in its entirety.

BACKGROUND

Field

The present specification relates honeycomb filter bodies, particulate filters comprising honeycomb filter bodies, and methods for making such honeycomb filter bodies and particulate filters.

Technical Background

Ceramic wall flow filters are employed to remove particulates from fluid exhaust streams, such as from combustion engine exhaust. Examples include ceramic soot filters used to remove particulates from diesel engine exhaust gases; and gasoline particulate filters (GPF) used to remove particulates from gasoline engine exhaust gases. For wall flow filters, exhaust gas to be filtered enters inlet cells and passes through the cell walls to exit the filter via outlet channels, with the particulates being trapped on or within the inlet cell walls as the gas traverses and then exits the filter. The particulates may be comprised of soot and/or ash. Accumulations of ash and/or soot typically can occur inside the filter after extended exposure to engine exhaust gases.

There is an ongoing need to improve FE and achieve lower pressure drop of particulate filters, such as gasoline particulate filters for engine exhaust systems.

SUMMARY

In an aspect, a honeycomb filter body comprises: a clean filter pressure drop of ($P_1$) and a clean filtration efficiency of ($FE_1$); a porous ceramic honeycomb body comprising a first end, a second end, and a plurality of walls having wall surfaces defining a plurality of inner channels, the porous ceramic honeycomb body comprising a base clean filter pressure drop ($P_0$) and a base clean filtration efficiency ($FE_0$); and a porous inorganic layer disposed on one or more of the wall surfaces of the porous ceramic honeycomb body; wherein an overall performance parameter of the honeycomb filter body is defined as "X", which according to Formula (I):

$$\frac{(FE_1 - FE_0)*P_0}{(P_1 - P_0)*FE_0};$$  Formula (I)

a filtration performance is defined as "F", which is according to Formula (II):

$$\frac{FE_1 - FE_0}{FE_0};$$  Formula (II)

and
X is greater than or equal to 1.75, and F is greater than or equal to 0.25.

In another aspect, a honeycomb filter body comprises: a porous ceramic honeycomb body comprising a first end, a second end, and a plurality of walls having wall surfaces defining a plurality of inner channels; a porous inorganic layer disposed on one or more of the wall surfaces of the porous ceramic honeycomb body, the porous inorganic layer comprising an average porosity ($\varepsilon$), a mean particle size ($d_p$) in micrometers, and a thickness tm; wherein a morphology parameter of the porous inorganic layer is defined as "Y", which is according to Formula (IV):

$$\left(\varepsilon^{6.5/d_p^{0.5}}\right)*\left(\frac{1-\varepsilon}{d_p^{0.5}}\right);$$  Formula (IV)

and
Y is greater than or equal to 0.02.

Additional aspects include methods for applying an inorganic material to a honeycomb filter body.

Additional features and advantages will be set forth in the detailed description, which follows, and in part will be readily apparent to those skilled in the art from that description or recognized by practicing the embodiments described herein, comprising the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
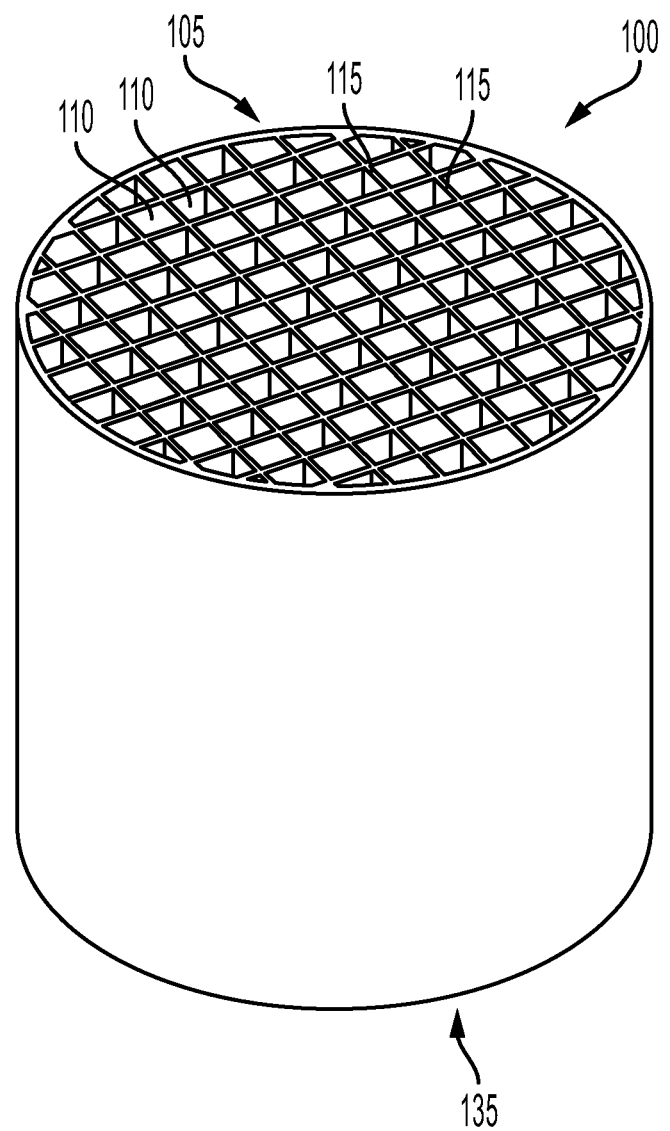
FIG. 1 schematically depicts a honeycomb filter body according to embodiments disclosed and described herein.

Reference will now be made in detail to embodiments of honeycomb filter bodies comprising a porous honeycomb body with a porous inorganic layer thereon, embodiments of which are illustrated in the accompanying drawings. Whenever possible, the same reference numerals will be used throughout the drawings to refer to the same or like parts. In embodiments, a honeycomb filter body comprises a porous ceramic honeycomb body comprising a first end, a second end, and a plurality of walls having wall surfaces defining a plurality of inner channels; and a porous inorganic layer disposed on one or more of the wall surfaces of the honeycomb body. The honeycomb filter body has a clean filter pressure drop of ($P_1$) and a clean filtration efficiency of ($FE_1$). The porous ceramic honeycomb body which does not include the porous inorganic layer has a base clean filter pressure drop ($P_0$) and a base clean filtration efficiency ($FE_0$). The porous inorganic layer comprises an average porosity ($\varepsilon$), a mean particle size ($d_p$) in micrometers, and a thickness (tm). Reference herein to "clean" pressure drop and "clean" filtration efficiency means that analysis is done on the respective honeycomb filter body or porous ceramic honeycomb body in the absence of any soot or exhaust particulate trapping in the body.

The honeycomb filter bodies herein possess one or more of the following parameters alone, or in combination:

an overall performance parameter of the honeycomb filter body defined as "X", which according to Formula (I):

$$\frac{(FE_1 - FE_0) * P_0}{(P_1 - P_0) * FE_0},\qquad \text{Formula (I)}$$

wherein X is greater than or equal to 1.75;

a filtration performance of the honeycomb filter body defined as "F", which is according to Formula (II):

$$\frac{FE_1 - FE_0}{FE_0},\qquad \text{Formula (II)}$$

wherein F is greater than or equal to 0.25;

a pressure drop performance defined as "P", which is according to Formula (III):

$$\frac{P_1 - P_0}{P_0},\qquad \text{Formula (III)}$$

wherein P is less than or equal to 0.25; and a morphology parameter of the porous inorganic layer defined as "Y", which is according to Formula (IV):

$$\left(\varepsilon^{6.5/d_p^{0.5}}\right) * \left(\frac{1-\varepsilon}{d_p^{0.5}}\right),\qquad \text{Formula (IV)}$$

wherein Y is greater than or equal to 0.02.

In various embodiments, cordierite honeycomb monolith structures can been used for GPFs. Artificial membrane or inorganic porous layers may be applied to the walls of the cordierite honeycomb monolith structures. The layers prevent penetration of soot into the wall, thereby eliminating or reducing the increase in the pressure drop due to the deep bed soot penetration. The layer results in improving the filtration efficiency performance of the filter by itself acting as an effective filtering medium. However, such layers can increase the pressure drop across the filter by reducing the hydraulic diameter of the channels and/or by reducing effective length of the filter (due to part of membrane layer forming a plug at the back end of the inlet channel). Preferably the layers result in increased filtration efficiency performance and a small increase in pressure drop penalty due to the layer. In some embodiments, such layers only partially cover a channel length. Honeycomb filter bodies herein exhibit high filtration efficiency (particularly in a clean or very low soot or ash load) and low pressure drop at such high filtration efficiencies.

Various embodiments of honeycomb filter bodies and methods of making such honeycomb filter bodies will be described herein with specific reference to the appended drawings. In some embodiments, a particulate filter is provided, the particulate filter comprising a honeycomb body comprising a plugged porous ceramic honeycomb structure comprising a plurality of intersecting porous walls comprising porous wall surfaces that define a plurality of channels extending from an inlet end to an outlet end of the structure, the plurality of channels comprising inlet channels sealed at or near the outlet end and having a surface area, and outlet channels sealed at or near the inlet end and having a surface area, the inlet channels and the outlet channels defining filtration area, wherein one or more of the porous wall surfaces defining the inlet channels comprise a base wall portion and filtration material deposits disposed on the base wall portion, wherein the filtration material deposits are disposed on the base wall portions.

In some embodiments, the filtration material deposits are preferably mechanically stable, such as being resistant to dislodgement or rearrangement such as due to high gas flow through the plugged honeycomb structure of the particulate filter, and/or such as due to mechanical vibration. In one or more embodiments, the filtration material deposits are stable when exposed to water such that the deposits maintain their location or position on the cell walls. In other words, according to some embodiments, the filtration material deposits are bound to the porous ceramic base walls. In some embodiments, the deposits are chemically bound, not just bound by physical bonding. For example, in some embodiments, the flame pyrolysis filtration material deposits are fused or sintered to the porous ceramic base wall. In addition, in some embodiments, the flame pyrolysis filtration material deposits are fused or sintered to each other to form a layer of porous inorganic material.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to".

A honeycomb body, as referred to herein, comprises a shaped ceramic honeycomb structure, or matrix, of intersecting walls to form cells the define channels. The ceramic honeycomb structure may be formed, extruded, or molded, and may be of any shape or size. For example, a ceramic honeycomb structure may be formed from cordierite or other suitable ceramic material.

A honeycomb body, as referred to herein, may also refer to a shaped ceramic honeycomb structure having a surface treatment, such as at least one layer, applied to wall surfaces of the honeycomb structure, and configured to filter particulate matter from a gas stream. There may be more than one layer applied to the same location of the honeycomb structure. The surface treatment, such as a layer, may be inorganic or organic or both. For example, a honeycomb body may, in one or more embodiments, be formed from cordierite or other ceramic material and have a porous inorganic layer applied to surfaces of the cordierite honeycomb structure. The layer may be "filtration material" which is to provide enhanced filtration efficiency, both locally through and at the wall and globally through the honeycomb body. Filtration material is not considered to be catalytically active in that it does not react with components of a gaseous mixture of an exhaust stream.

As used herein, "green" or "green ceramic" are used interchangeably and refer to an unsintered material, unless otherwise specified.

A honeycomb body of one or more embodiments may comprise a honeycomb structure and a layer disposed on one or more walls of the honeycomb structure. In some embodiments, the layer is applied to surfaces of walls present within honeycomb structure, where the walls have surfaces that define a plurality of inner channels. The inner channels, when present, may have various cross-sectional shapes, such as circles, ovals, triangles, squares, pentagons, hexagons, or tessellated combinations or any of these, for example, and may be arranged in any suitable geometric configuration. The inner channels, when present, may be discrete or intersecting and may extend through the honeycomb body from a first end thereof to a second end thereof, which is opposite the first end.

With reference now to FIG. 1, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105 and second end 135 of the honeycomb body. The honeycomb body may have one or more of the channels plugged on one, or both of the first end 105 and the second end 135. The pattern of plugged channels of the honeycomb body is not limited. In some embodiments, a pattern of plugged and unplugged channels at one end of the honeycomb body may be, for example, a checkerboard pattern where alternating channels of one end of the honeycomb body are plugged. In some embodiments, plugged channels at one end of the honeycomb body have corresponding unplugged channels at the other end, and unplugged channels at one end of the honeycomb body have corresponding plugged channels at the other end. Thus, in some embodiments, a particulate filter such as a gasoline particulate filter (GPF) comprises honeycomb structures formed by arrays of parallel channels bounded and separated by the porous cell walls, with a portion of the channels being blocked or plugged, for example some channels are plugged at the filter inlet and the remaining channels are plugged at the filter outlet. Exhaust gas to be filtered thus enters the unplugged inlet channels and passes through the channel walls to exit the filter via the unplugged outlet channels, with the particulates being trapped on or within the inlet channel walls as the gas traverses the filter.

In one or more embodiments, the honeycomb body may be formed from cordierite, aluminum titanate, enstatite, mullite, forsterite, corundum (SiC), spinel, sapphirine, and periclase. In general, cordierite is a solid solution having a composition according to the formula $(Mg,Fe)_2Al_3(Si_5AlO_{18})$. In some embodiments, the pore size of the ceramic material may be controlled, the porosity of the ceramic material may be controlled, and the pore size distribution of the ceramic material may be controlled, for example by varying the particle sizes of the ceramic raw materials. In addition, pore formers may be included in ceramic batches used to form the honeycomb body.

In some embodiments, walls of the honeycomb body may have an average thickness from greater than or equal to 25 µm to less than or equal to 250 µm, such as from greater than or equal to 45 µm to less than or equal to 230 µm, greater than or equal to 65 µm to less than or equal to 210 µm, greater than or equal to 65 µm to less than or equal to 190 µm, or greater than or equal to 85 µm to less than or equal to 170 µm. The walls of the honeycomb body can be described to have a base wall portion comprised of a bulk portion (also referred to herein as the bulk), and surface portions (also referred to herein as the surface). The surface portion of the walls extends from a surface of a wall of the honeycomb body into the wall toward the bulk portion of the honeycomb body. The surface portion may extend from 0 (zero) to a depth of about 10 µm into the base wall portion of the wall of the honeycomb body. In some embodiments, the surface portion may extend about 5 µm, about 7 µm, or about 9 µm (i.e., a depth of 0 (zero)) into the base wall portion of the wall. The bulk portion of the honeycomb body constitutes the thickness of wall minus the surface portions. Thus, the bulk portion of the honeycomb body may be determined by the following equation:

$$t_{total} - 2t_{surface}$$

where $t_{total}$ is the total thickness of the wall and $t_{surface}$ is the thickness of the wall surface.

In one or more embodiments, the bulk of the honeycomb body has a bulk mean pore size from greater than or equal to 7 µm to less than or equal to 25 µm, such as from greater than or equal to 12 µm to less than or equal to 22 µm, or from greater than or equal to 12 µm to less than or equal to 18 µm. For example, in some embodiments, the bulk of the honeycomb body may have bulk mean pore sizes of about 10 µm, about 11 µm, about 12 µm, about 13 µm, about 14 µm, about 15 µm, about 16 µm, about 17 µm, about 18 µm, about 19 µm, or about 20 µm. Generally, pore sizes of any given material exist in a statistical distribution. Thus, the term "median pore size" or "$D_{50}$" refers to which pore sizes of 50% of the pores lie and below and which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In some embodiments, the bulk of the honeycomb body may have bulk porosities, not counting a coating, of from greater than or equal to 50% to less than or equal to 70% as measured by mercury intrusion porosimetry. A method for measuring surface porosity includes scanning electron microscopy (SEM), this method in particular is valuable for measuring surface porosity and bulk porosity independent from one another. In one or more embodiments, the bulk porosity of the honeycomb body may be less than 70%, less than 65%, 60%, less than 58%, less than 56%, less than 54%, or less than 52%, for example.

In one or more embodiments, the surface portion of the honeycomb body has a surface median pore size from greater than or equal to 7 µm to less than or equal to 20 µm, such as from greater than or equal to 8 µm to less than or equal to 15 µm, or from greater than or equal to 10 µm to less than or equal to 14 µm. For example, in some embodiments, the surface of the honeycomb body may have surface median pore sizes of about 8 µm, about 9 µm, about 10 µm, about 11 µm, about 12 µm, about 13 µm, about 14 µm, or about 15 µm.

In some embodiments, the surface of the honeycomb body may have surface porosities, prior to application of a layer, of from greater than or equal to 35% to less than or equal to 50% as measured SEM. In one or more embodiments, the surface porosity of the honeycomb body may be less than 65%, such as less than 60%, less than 55%, less than 50%, less than 48%, less than 46%, less than 44%, less than 42%, less than 40%, less than 48%, or less than 36% for example.

Figure 3:
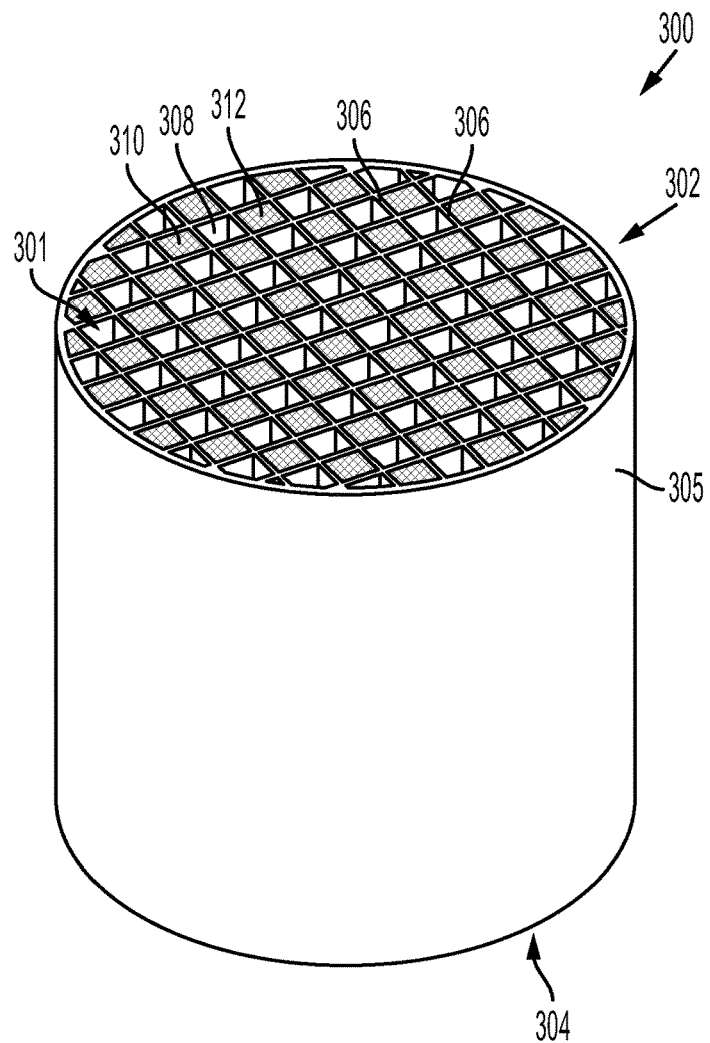
FIG. 3 schematically depicts a particulate filter according to embodiments disclosed and described herein.
Figure 4:
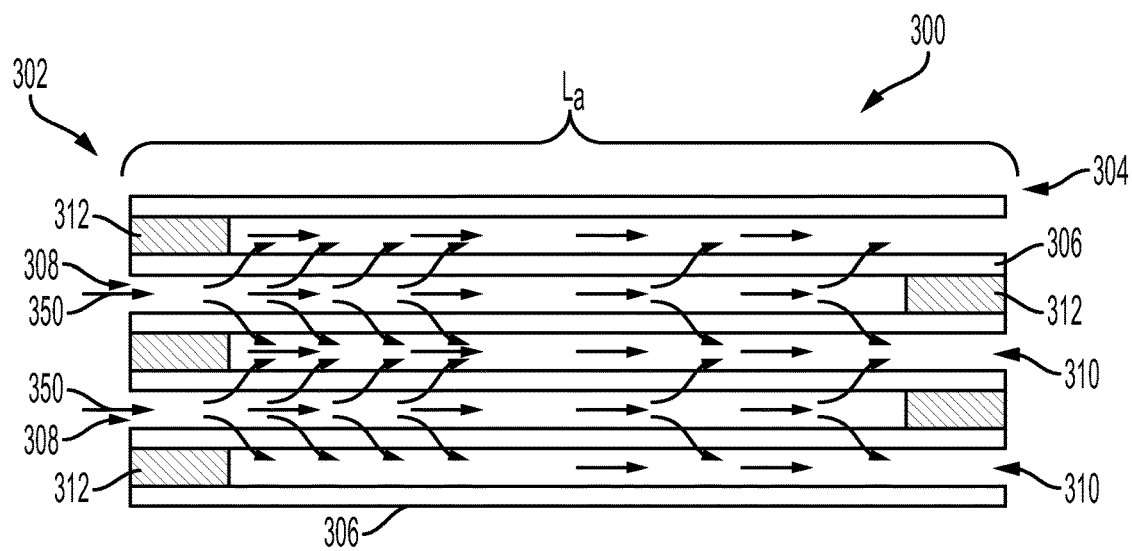
FIG. 4 is a cross-sectional view of the particulate filter shown in FIG. 4.

Referring now to FIGS. 3 and 4, a honeycomb body in the form of a particulate filter 300 is schematically depicted. The particulate filter 300 may be used as a wall-flow filter to filter particulate matter from an exhaust gas stream 350, such as an exhaust gas stream emitted from a gasoline engine, in which case the particulate filter 300 is a gasoline particulate filter. The particulate filter 300 generally comprises a honeycomb body having a plurality of channels 301 or cells which extend between an inlet end 302 and an outlet end 404, defining an overall length $L_a$. The channels 301 of the particulate filter 300 are formed by, and at least partially defined by a plurality of intersecting channel walls 306 that extend from the inlet end 302 to the outlet end 304. The particulate filter 300 may also include a skin layer 305 surrounding the plurality of channels 301. This skin layer 305 may be extruded during the formation of the channel walls 306 or formed in later processing as an after-applied skin layer, such as by applying a skinning cement to the outer peripheral portion of the channels.

An axial cross section of the particulate filter 300 of FIG. 3 is shown in FIG. 4. In some embodiments, certain channels are designated as inlet channels 308 and certain other channels are designated as outlet channels 310. In some embodiments of the particulate filter 300, at least a first set of channels may be plugged with plugs 312. Generally, the plugs 312 are arranged proximate the ends (i.e., the inlet end or the outlet end) of the channels 301. The plugs are generally arranged in a pre-defined pattern, such as in the checkerboard pattern shown in FIG. 3, with every other channel being plugged at an end. The inlet channels 308 may be plugged at or near the outlet end 304, and the outlet channels 310 may be plugged at or near the inlet end 302 on channels not corresponding to the inlet channels, as depicted in FIG. 3. Accordingly, each cell may be plugged at or near one end of the particulate filter only.

While FIG. 3 generally depicts a checkerboard plugging pattern, it should be understood that alternative plugging patterns may be used in the porous ceramic honeycomb article. In the embodiments described herein, the particulate filter 300 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 306 of the particulate filter 300 may have a thickness of greater than about 4 mils (101.6 microns). For example, in some embodiments, the thickness of the channel walls 306 may be in a range from about 4 mils up to about 30 mils (762 microns). In some other embodiments, the thickness of the channel walls 306 may be in a range from about 7 mils (177.8 microns) to about 20 mils (508 microns).

Figure 2:
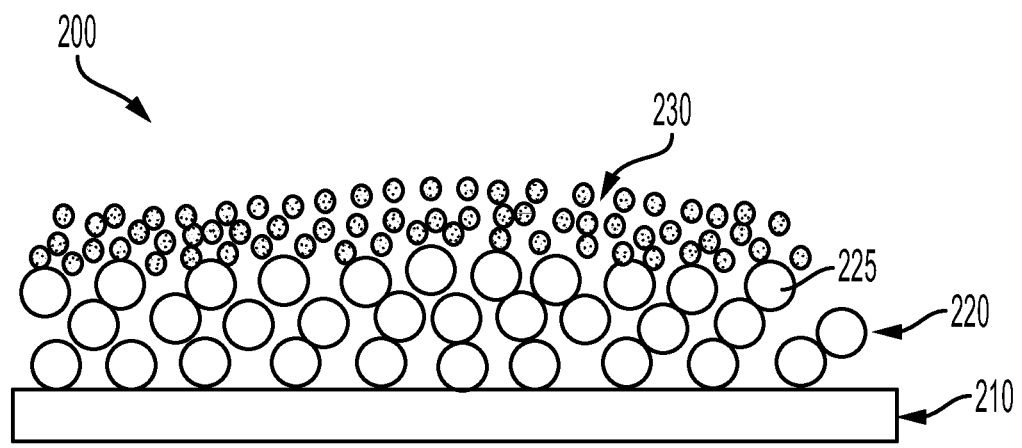
FIG. 2 schematically depicts a honeycomb filter body with soot loading according to embodiments disclosed and described herein.

In various embodiments the honeycomb body is configured to filter particulate matter from a gas stream. Accordingly, the median pore size, porosity, geometry and other design aspects of both the bulk and the surface of the honeycomb body are selected taking into account these filtration requirements of the honeycomb body. As an example, and as shown in the embodiment of FIG. 2, a wall 210 of the honeycomb body 200 has layer 220 disposed thereon, preferably sintered or otherwise bonded by heat treatment. The layer 220 may comprise particles 225 that are deposited on the wall 210 of the honeycomb body 200 and help prevent particulate matter from exiting the honeycomb body along with the gas stream 230, such as, for example, soot and ash, and to help prevent the particulate matter from clogging the base wall portion of the walls 210 of the honeycomb body 200. In this way, and according to embodiments, the layer 220 can serve as the primary filtration component while the base wall portion of the honeycomb body can be configured to otherwise minimize pressure drop for example as compared to conventional honeycomb bodies without such layer. Pressure drop, as used herein, is measured using a differential pressure sensor to measure the drop in pressure across the axial length of the filter. Because pore size of the layer 220 is smaller than that of the base wall portion, the layer will filter most of the smaller-sized particulate matter, but it is expected that the base wall portion of the walls of the honeycomb body filter is effective to filter some of the larger-sized particulate matter. As will be described in further detail herein, the honeycomb body may be formed by a suitable method—such as, for example, a flame deposition method—that allows for a thin, highly porous layer to be formed on at least some surfaces of the walls of the honeycomb body.

In one or more embodiments, the porosity of the layer disposed on the walls of the honeycomb body, as measured by SEM, is greater than or equal to 50%, such as greater than 55%, such as greater than 60%, such as greater than 65%, such as greater than 70%, such as greater than 75%, such as greater than 80%, such as greater than 90%. In other embodiments, the porosity of the layer disposed on the walls of the honeycomb body is greater than or equal to 92%, such as greater than or equal to 93%, or greater than or equal to 94%. In still other embodiments, the porosity of the layer disposed on the walls of the honeycomb body is greater than or equal to 95%, such as greater than or equal to 96%, or greater than or equal to 97%. In various embodiments, the porosity of the layer disposed on the walls of the honeycomb body is less than or equal to 99%, such as less than or equal to 97%, less than or equal to 95%, less than or equal to 94%, or less than or equal to 93%, less than or equal to 90%, less than or equal to 85%, less than or equal to 80%, less than or equal to 75%. The porosity of the layer on the walls of the honeycomb body allows for the layer to be applied to a honeycomb body without significantly affecting the pressure drop of the honeycomb body compared to the pressure drop of an identical honeycomb body that does not comprise a layer thereon. SEM and X-ray tomography are useful for measuring surface and bulk porosity independently of one another. Obtaining porosity by density calculation includes: measuring weight of the inorganic layer and its thickness to obtain a layer density and calculating porosity of the layer according to the equation: layer porosity=1−layer density/ inorganic material density. As an example, for a layer comprising mullite, the "inorganic material density" is the density of mullite.

As mentioned above, the layer on walls of the honeycomb body is very thin compared to thickness of the base wall portion of the walls of the honeycomb body, and the layer also has porosity and permeability. As will be discussed in further detail below, the layer on the honeycomb body can be formed by methods that permit the layer to be applied to surfaces of walls of the honeycomb body in very thin layers. In embodiments, the average thickness of the layer on the base wall portion of the walls of the honeycomb body is from greater than or equal to 0.5 μm to less than or equal to 30 μm, such as from greater than or equal to 0.5 μm to less than or equal to 20 μm, greater than or equal to 0.5 μm to less than or equal to 10 μm, such as from greater than or equal to 0.5 μm to less than or equal to 5 μm, from greater than or equal to 1 μm to less than or equal to 4.5 μm, from greater than or equal to 1.5 μm to less than or equal to 4 μm, or from greater than or equal to 2 μm to less than or equal to 3.5 μm.

As discussed above, the layer can be applied to the walls of the honeycomb body by methods that permit the inorganic layer to have a small median pore size. This small median pore size allows the layer to filter a high percentage of particulate and prevents particulate from penetrating honeycomb and settling into the pores of the honeycomb, as described above with reference to FIG. 2. The small median pore size of layer according to embodiments increases the filtration efficiency of the honeycomb body. In one or more embodiments, the layer on the walls of the honeycomb body has a median pore size from greater than or equal to 0.1 μm to less than or equal to 5 μm, such as from greater than or equal to 0.5 μm to less than or equal to 4 μm, or from greater than or equal to 0.6 μm to less than or equal to 3 μm. For example, in some embodiments, the layer on the walls of the honeycomb body may have median pore sizes of about 0.5 μm, about 0.6 μm, about 0.7 μm, about 0.8 μm, about 0.9 μm, about 1 μm, about 2 μm, about 3 μm, or about 4 μm.

Although the layer on the walls of the honeycomb body may, in embodiments, cover substantially 100% of the wall surfaces defining inner channels of the honeycomb body, in other embodiments, the layer on the walls of the honeycomb body covers less than substantially 100% of the wall surfaces defining inner channels of the honeycomb body. For instance, in one or more embodiments, the layer on the walls of the honeycomb body covers at least 70% of the wall surfaces defining inner channels of the honeycomb body, covers at least 75% of the wall surfaces defining inner channels of the honeycomb body, covers at least 80% of the wall surfaces defining inner channels of the honeycomb body, covers at least 85% of the wall surfaces defining inner channels of the honeycomb body, covers at least 90% of the wall surfaces defining inner channels of the honeycomb body, or covers at least 85% of the wall surfaces defining inner channels of the honeycomb body.

As described above with reference to FIG. 1, the honeycomb body can have a first end and second end. The first end and the second end are separated by an axial length. In some embodiments, the layer on the walls of the honeycomb body may extend the entire axial length of the honeycomb body (i.e., extends along 100% of the axial length). However, in other embodiments, the layer on the walls of the honeycomb body extends along at least 60% of the axial length, such as extends along at least 65% of the axial length, extends along at least 70% of the axial length, extends along at least 75% of the axial length, extends along at least 80% of the axial length, extends along at least 85% of the axial length, extends along at least 90% of the axial length, or extends along at least 95% of the axial length.

In embodiments, the layer on the walls of the honeycomb body extends from the first end of the honeycomb body to the second end of the honeycomb body. In some embodiments, the layer on the walls of the honeycomb body extends the entire distance from the first surface of the honeycomb body to the second surface of the honeycomb body (i.e., extends along 100% of a distance from the first surface of the honeycomb body to the second surface of the honeycomb body). However, in one or more embodiments, the layer on the walls of the honeycomb body extends along 60% of a distance between the first surface of the honeycomb body and the second surface of the honeycomb body, such as extends along 65% of a distance between the first surface of the honeycomb body and the second surface of the honeycomb body, extends along 70% of a distance between the first surface of the honeycomb body and the second surface of the honeycomb body, extends along 75% of a distance between the first surface of the honeycomb body and the second surface of the honeycomb body, extends along 80% of a distance between the first surface of the honeycomb body and the second surface of the honeycomb body, extends along 85% of a distance between the first surface of the honeycomb body and the second surface of the honeycomb body, extends along 90% of a distance between the first surface of the honeycomb body and the second surface of the honeycomb body, or extends along 95% of a distance between the first surface of the honeycomb body and the second surface of the honeycomb body.

In one or more embodiments, the layer on the walls of the honeycomb body is disposed on the wall surfaces as a continuous coating. As used herein a "continuous coating" is an area where no portion of the area is essentially bare, or free of the layer material. In one or more embodiments, at least 50% of the layer is disposed on the wall surfaces of the honeycomb body as a continuous layer, such as at least 60% of the layer is disposed on the wall surfaces of the honeycomb body as a continuous layer, at least 70% of the layer is disposed on the wall surfaces of the honeycomb body as a continuous layer, at least 80% of the layer is disposed on the wall surfaces of the honeycomb body as a continuous layer, at least 90% of the layer is disposed on the wall surfaces of the honeycomb body as a continuous layer, at least 92% of the layer is disposed on the wall surfaces of the honeycomb body as a continuous layer, at least 94% of the layer is disposed on the wall surfaces of the honeycomb body as a continuous layer, at least 96% of the layer is disposed on the wall surfaces of the honeycomb body as a continuous layer, or at least 98% of the layer is disposed on the wall surfaces of the honeycomb body as a continuous layer. In other embodiments 100% of the layer is disposed on the wall surfaces of the honeycomb body as a continuous layer.

In one or more embodiments, the layer on the walls of the honeycomb body is disposed on the wall surfaces as a surface treatment of discrete deposits or discontinuous coating. The discontinuous coating may have discrete sections of bare walls where there is no layer. Overall, the discontinuous coating may provide coverage in total on the wall—based on the summation of coverage by each discrete section—of greater than or equal to 70%, greater than or equal to 75%, greater than or equal to 80%, greater than or equal to 85%, greater than or equal to 90%, greater than or equal to 95%, greater than or equal to 97.5%, greater than or equal to 99%.

As stated above, and without being bound by any particular theory, it is believed that a low pressure drop is achieved by honeycomb bodies of embodiments because the layer on the honeycomb body is a primary filtration component of the honeycomb body, which allows for more flexibility in designing a honeycomb body. The selection of a honeycomb body having a low pressure drop in combination with the low thickness and porosity of the layer on the honeycomb body according to embodiments allows a honeycomb body of embodiments to have a low pressure drop when compared to conventional honeycomb bodies. In embodiments, the layer is in the range of from 0.1 to 30 g/L on the honeycomb body. In embodiments, the layer may be present in the range of: from 0.2 to 20 g/L, from 0.3 to 25 g/L, from 0.4 to 20 g/L, from 1 to 10 g/L. In some embodiments, the pressure drop (i.e., a clean pressure drop without soot or ash) across the honeycomb body as compared to a honeycomb without a thin porous inorganic layer is less than or equal to 10%, such as less than or equal to 9%, or less than or equal to 8%. In other embodiments, the pressure drop across the honeycomb body is less than or equal to 7%, such as less than or equal to 6%. In still other embodiments, the pressure drop across the honeycomb body is less than or equal to 5%, such as less than or equal to 4%, or less than or equal to 3%.

As stated above, and without being bound to any particular theory, small pore sizes in the layer on the walls of the honeycomb body allow the honeycomb body to have good filtration efficiency even before ash or soot build-up occurs in the honeycomb body. The filtration efficiency of honeycomb bodies is measured herein using the protocol outlined in Tandon et al., 65 Chemical engineering Science 4751-60 (2010). As used herein, the initial filtration efficiency of a honeycomb body refers to a honeycomb body in a clean state, such as new or regenerated honeycomb body, that does not comprise any measurable soot or ash loading. In embodiments, the initial filtration efficiency (i.e., clean filtration efficiency) of the honeycomb body is greater than or equal to 70%, such as greater than or equal to 80%, or greater than or equal to 85%. In yet other embodiments, the initial filtration efficiency of the honeycomb body is greater than 90%, such as greater than or equal to 93%, or greater than or equal to 95%, or greater than or equal to 98%.

The layer on the walls of the honeycomb body according to embodiments is thin and has a porosity, and in some embodiments the layer on walls of the honeycomb body also has good chemical durability and physical stability. Particularly if solidified, sintered, or otherwise bonded to the surface of the honeycomb body after the layer material is applied to the walls of the honeycomb body, as will be discussed in more detail below. The chemical durability and physical stability of the layer on the honeycomb body can be determined, in embodiments, by subjecting the honeycomb body to test cycles comprising burn out cycles and an aging test and measuring the initial filtration efficiency before and after the test cycles. For instance, one exemplary method for measuring the chemical durability and the physical stability of the honeycomb body comprises measuring the initial filtration efficiency of a honeycomb body; loading soot onto the honeycomb body under simulated operating conditions; burning out the built up soot at about 650° C.; subjecting the honeycomb body to an aging test at 1050° C. and 10% humidity for 12 hours; and measuring the filtration efficiency of the honeycomb body. Multiple soot build up and burnout cycles may be conducted. A small change in filtration efficiency ($\Delta FE$) from before the test cycles to after the test cycles indicates better chemical durability and physical stability of the layer on the honeycomb body. In some embodiments, the $\Delta FE$ is less than or equal to 5%, such as less than or equal to 4%, or less than or equal to 3%. In other embodiments, the $\Delta FE$ is less than or equal to 2%, or less than or equal to 1%.

In some embodiments, the layer on the walls of the honeycomb body may be comprised of one or a mixture of ceramic components, such as, for example, ceramic components selected from the group consisting of $SiO_2$, $Al_2O_3$, $MgO$, $ZrO_2$, $CaO$, $TiO_2$, $CeO_2$, $Na_2O$, Pt, Pd, Ag, Cu, Fe, Ni, and mixtures thereof. Thus, the layer on the walls of the honeycomb body may comprise an oxide ceramic or an aluminum silicate. As discussed in more detail below, the method of making the layer on the honeycomb body according to embodiments can allow for customization of the layer composition for a given application. This may be beneficial because the ceramic components may be combined to match, for example, the physical properties—such as, for example coefficient of thermal expansion (CTE) and Young's modulus, etc.—of the honeycomb body, which can improve the physical stability of the honeycomb body. In some embodiments, the layer on the walls of the honeycomb body may comprise cordierite, aluminum titanate, enstatite, mullite, forsterite, corundum (SiC), spinel, sapphirine, and periclase. In some embodiments, the cordierite, aluminum titanate, enstatite, mullite, forsterite, corundum (SiC), spinel, sapphirine, and/or periclase is synthetic. In one or more embodiments, the inorganic layer comprises a synthetic mullite. Mullite is a rare aluminium silicate mineral and can form two stoichiometric forms $3Al_2O_3 \cdot 2SiO_2$ or $2Al_2O_3 \cdot SiO_2$, in accordance with the general structure $xAl_2O_3 \bullet ySiO_2$. Preparation of synthetic mullite includes process controls to target $1.5 \leq x/y \leq 2$ or to target Al/Si mass ratio in the range of 2.9 to 3.8.

In some embodiments, the composition of the layer on the walls of the honeycomb body is the same as the composition of the honeycomb body. However, in other embodiments, the composition of the layer is different from the composition of the honeycomb body.

The layer, according to one or more embodiments, has a permeability of $\geq 10^{-15}$ $m^2$. In some embodiments the layer has a permeability of $\geq 10^{-14}$ $m^2$, such as $\geq 10^{-13}$ $m^2$, or $\geq 10^{-12}$ $m^2$.

In some embodiments, the layer is comprised of mullite and has an average particle size from greater than or equal to 5 nm to less than or equal to 3 μm. In such embodiments, the thickness and porosity of the layer may be a thickness depending on the desired properties of the honeycomb body.

In some embodiments, the layer is comprised of alumina and has an average particle size from greater than or equal to 10 nm to less than or equal to 3 μm. In some embodiments the average particle size is from greater than or equal to 100 nm to less than or equal to 3 μm, such as greater than or equal to 500 nm to less than or equal to 3 μm, or greater than or equal to 500 nm to less than or equal to 2 μm. In such embodiments, the thickness and porosity of the layer on the honeycomb body may be a thickness depending on the desired properties of the honeycomb body.

The properties of the layer and, in turn, the honeycomb body overall are attributable to the ability of applying a thin, porous layer having small median pore sizes to a honeycomb body.

Methods of making a honeycomb body according to some embodiments disclosed and described herein comprise: atomizing, vaporizing, or misting a layer precursor so that the layer precursor may be carried by a gaseous carrier fluid; depositing the atomized, vaporized, or misted layer precursor on a ceramic honeycomb structure; and binding the atomized, vaporized, or misted layer precursor to the ceramic honeycomb structure to form a layer on the ceramic honeycomb structure. In embodiments, the gaseous carrier fluid can be, for example, air, oxygen, or nitrogen. In some embodiments, the layer precursor may be combined with a solvent—such as a solvent selected from the group consisting of methoxyethanol, ethanol, water and mixtures thereof—before the layer precursor is atomized, vaporized, or misted. The layer precursor is, in one or more embodiments, blown into inner channels of the ceramic honeycomb structure. The layer precursor particles may be bound to the ceramic honeycomb structure by a suitable method including applying moisture—such as, for example, steam or humidity—heat, or radiation—such as, for example, microwaves—to the layer precursor after the layer precursor has been deposited on the ceramic honeycomb structure.

Methods of making a honeycomb body according to some embodiments disclosed and described herein comprise flame pyrolysis deposition of a layer to a ceramic honeycomb structure, which provides for deposition of a very thin layer having a porosity and small median pore size. In embodiments, methods of making a honeycomb body comprise: vaporizing a layer precursor to form a vaporized layer precursor by contacting the layer precursor with a vaporizing gas (the layer precursor may comprise a precursor material and a solvent); decomposing the vaporized layer precursor by contacting the vaporized layer precursor with a flame; depositing the vaporized layer precursor on a ceramic honeycomb structure; and sintering the vaporized layer precursor to form the honeycomb body, wherein the honeycomb body comprises a layer that coats at least a portion of walls of the ceramic honeycomb structure. In one or more embodiments, the layer precursor is selected from the group consisting of CaO, $Ca(OH)_2$, $CaCO_3$, MgO, $Mg(OH)_2$, $MgCO_3$, $SiO_2$, $Al_2O_3$, $Al(OH)_3$, calcium aluminates, magnesium aluminates, and mixtures thereof.

In some embodiments, the method of forming a honeycomb body comprises forming or obtaining a layer precursor that comprises a ceramic precursor material and a solvent. The ceramic precursor material of the layer precursor comprises conventional raw ceramic materials that serve as a source of, for example, $SiO_2$, $Al_2O_3$, $TiO_2$, MgO, $ZrO_2$, CaO, $CeO_2$, $Na_2O$, Pt, Pd, Ag, Cu, Fe, Ni, and the like. For example, in some embodiments, the ceramic precursor material is selected from the group consisting of tetraethyl orthosilicate, magnesium ethoxide and aluminum(III) tri-sec-butoxide, trimethylaluminum, $AlCl_3$, $SiCl_4$, $Al(NO_3)_3$, aluminum isopropoxide, octamethyl cyclotetrasiloxane, and mixtures thereof. The solvent used in the layer precursor is not particularly limited as long as it is capable of maintaining a suspension of the ceramic precursor material within the solvent, and the solvent is capable of being vaporized at temperatures less than 200° C. In embodiments, the solvent is selected from the group consisting of methoxyethanol, ethanol, water, xylene, methanol, ethylacetate, benzene, and mixtures thereof.

In some embodiments, the layer precursor is vaporized to form a vaporized layer precursor by contacting the layer precursor with a vaporizing fluid. In one or more embodiments, the vaporizing fluid is selected from the group consisting of oxygen ($O_2$), water (steam, $H_2O$), nitrogen ($N_2$), and mixtures thereof. The vaporizing fluid is flowed at a high flow rate relative to the flow rate of the layer precursor so that when the vaporizing fluid contacts the layer precursor, the layer precursor is vaporized to a molecular level by the vaporizing fluid. For example, in embodiments, the vaporizing fluid is a gas that is flowed at a flow rate from greater than or equal to 3 L/min to less than or equal to 100 L/min mL/min, such as from greater than or equal to 4 L/min to less than or equal to 6.5 L/min, or from greater than or equal to 25 L/min to less than or equal to 35 L/min. In other embodiments, the vaporizing gas is flowed at a flow rate from greater than or equal to 60 L/min to less than or equal to 70 L/min.

The flow rate of the gaseous vaporizing fluid is, in embodiments, greater than the flow rate of the layer precursor. Accordingly, in one or more embodiments, the layer precursor is flowed at a flow rate from greater than or equal to 1.0 mL/min to less than or equal to 50 mL/min, such as from greater than or equal to 3 mL/min to less than or equal to 5 mL/min, or from greater than or equal to 25 mL/min to less than or equal to 35 mL/min. The flow rate of the vaporizing fluid and the flow rate of the layer precursor can be controlled so that the layer precursor is vaporized when it is contacted with the vaporizing fluid.

According to some embodiments, once the layer precursor has been contacted with the vaporizing fluid to form the vaporized layer precursor, the vaporized layer precursor is decomposed by contacting the vaporized layer precursor with a flame. The flame may be formed by combusting a suitable combustion gas, such as, for example, oxygen, methane, ethane, propane, butane, natural gas, or mixtures thereof. Once the vaporized layer precursor contacts the flame, the energy from the flame causes the vaporized layer precursor to decompose to atomic-level components, and the solvent is combusted into gases, such as, for example, hydrogen ($H_2$), carbon dioxide ($CO_2$), and carbon monoxide (CO). This combustion provides elemental components of the ceramic precursor materials well dispersed in a gas. In one or more embodiments, the flame temperature is from greater than or equal to 800 K to less than or equal to 2500 K. This allows the vaporized layer precursor to be easily directed to and deposited on a honeycomb body. It should be understood that in embodiments one flame may be used to decompose the layer precursor; however, in other embodiments two or more flames may be used to decompose the layer precursor. In yet other embodiments, the vaporized layer precursor is not decomposed by a flame.

In one or more embodiments, the vaporized layer precursor, which is well-dispersed in a fluid, is directed to a honeycomb body, such as by using a wind tunnel or differential pressure to guide the vaporized layer precursor to the honeycomb body. Thereby, the vaporized layer precursor is deposited on the honeycomb body. In some embodiments, the honeycomb body may have one or more of the channels plugged on one end, such as, for example, the first end 105 of the honeycomb body during the deposition of the vaporized layer precursor to the honeycomb body. The plugged channels may, in some embodiments, be removed after deposition of the layer precursor. But, in other embodiments, the channels may remain plugged even after deposition of the layer precursor. The pattern of plugging channels of the honeycomb body is not limited, and in some embodiments all the channels of the honeycomb body may be plugged at one end. In other embodiments, only a portion of the channels of the honeycomb body may be plugged at one end. In such embodiments, the pattern of plugged and unplugged channels at one end of the honeycomb body is not limited and may be, for example, a checkerboard pattern where alternating channels of one end of the honeycomb body are plugged. By plugging all or a portion of the channels at one end of the honeycomb body during deposition of the vaporized layer precursor, the vaporized layer precursor may be evenly distributed within the channels 110 of the honeycomb body 100.

The vaporized layer precursor is, in some embodiments, deposited on the honeycomb body as an amorphous phase. For example, as discussed above, the ceramic precursor materials can be broken down to an elemental level in the decomposed layer precursor. The elemental components can be mixed together at an elemental level when deposited to the honeycomb body. For example, FIG. 3A is a scanning electron microscope (SEM) image of an amorphous phase of $5SiO_2.2Al_2O_3.2MgO$ decomposed layer precursor deposited on the surface of a honeycomb body; FIG. 3B is an SEM image of an amorphous phase of $2SiO_2.3Al_2O_3$ decomposed layer precursor deposited on the surface of a honeycomb body; FIG. 3C is an SEM image of an amorphous phase of $2SiO_2.5Al_2O_3.4MgO$ decomposed layer precursor deposited on the surface of honeycomb body; and FIG. 3D is an SEM image of an amorphous phase of $Al_2O_3.MgO$ decomposed layer precursor deposited on the surface of a honeycomb body. As can be seen in each of FIGS. 3A-3D, particles at an elemental level are dispersed in an amorphous phase upon the honeycomb body. In this amorphous phase, the decomposed layer precursor, which has been deposited on the honeycomb body, has a porosity, as calculated, for example, according to the density of the layer versus the density of the inorganic material of the layer—of greater than or equal to 95%, such as greater than or equal to 96%, or greater than or equal to 97%. In other embodiments, the amorphous phase decomposed layer precursor has a porosity of greater than or equal to 98%, or greater than or equal to 99%.

The porosity and pore size of the amorphous vaporized layer precursor and ultimately, the layer on the honeycomb body may, in some embodiments, be modified by the mean particle size of vaporized layer. The mean particle size of the vaporized layer may be controlled by the flow rate of layer precursor. For instance, as shown in FIGS. 4A-4D, the mean particle size of the vaporized layer precursor increases as the flow rate of the layer precursor increases. FIG. 4A a transmission electron microscopy (TEM) image of an amorphous $5SiO_2.2Al_2O_3.2MgO$ decomposed layer precursor deposited at layer precursor a flow rate of 3 mL/min; FIG. 4B is a TEM image of an amorphous $5SiO_2.2Al_2O_3.2MgO$ decomposed layer precursor deposited at a layer precursor flow rate of 1 mL/min; FIG. 4C is a TEM image of an amorphous $2SiO_2.3Al_2O_3$ decomposed layer precursor deposited at a layer precursor flow rate of 1 mL/min; and FIG. 4D is a TEM image of an amorphous $5SiO_2.2Al_2O_3.2MgO$ decomposed layer precursor and an amorphous $2SiO_2.3Al_2O_3$ decomposed layer precursor deposited using a dual flame processes with both flames having a layer precursor flow rate of 1 mL/min. As shown in FIGS. 4A-4D, the elements of the decomposed layer precursor were mixed at atomic level, forming a homogeneous phase having varying particle sizes depending on the flow rate of the layer precursor. However, in embodiments, the mean particle size of the vaporized layer precursor is from greater than or equal to 5 nm to less than or equal to 3 µm, such as from greater than or equal to 100 nm to less than or equal to 3 µm, or from greater than or equal to 200 nm to less than or equal to 1 µm. In other embodiments, the mean particle size of the vaporized layer precursor is from greater than or equal to 15 nm to less than or equal to 500 nm, such as from greater than or equal to 20 nm to less than or equal to 200 nm, or from greater than or equal to 25 nm to less than or equal to 100 nm.

Figure 5:
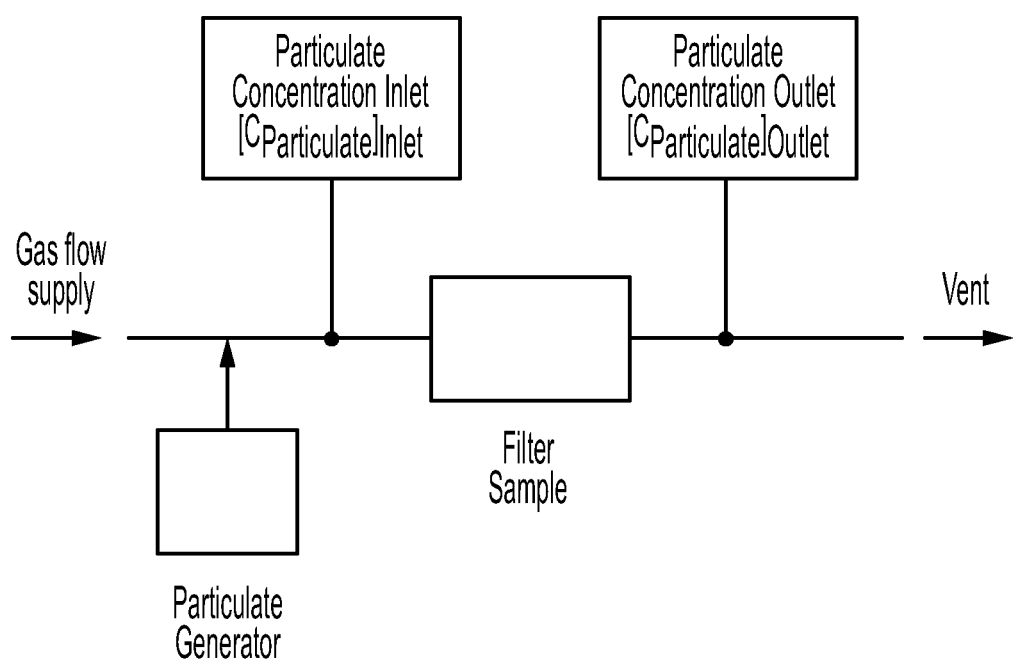
FIG. 5 is a schematic showing an experimental setup for testing particulate filters according to one or more embodiments.

As noted above, the chemical durability and physical stability can be imparted to the layer on the walls of the honeycomb body according to some embodiments disclosed and described herein. To improve these properties, the vaporized layer precursor can be, in one or more embodiments, sintered or otherwise bonded to the honeycomb body after it has been deposited on the honeycomb body to form a layer as a crystalline phase that coats at least a portion of the honeycomb body. According to embodiments, sintering the vaporized layer precursor comprises heating the vaporized layer precursor after it has been deposited on the honeycomb body to temperatures from greater than or equal to 950° C. to less than or equal to 1150° C., such as from greater than or equal to 1000° C. to less than or equal to 1100° C., from greater than or equal to 1025° C. to less than or equal to 1075° C., or about 1050° C. The duration of the sintering is, in some embodiments, from greater than or equal to 20 minutes to less than or equal to 2.0 hours, such as from greater than or equal to 30 minutes to less than or equal to 1.5 hours, or from greater than or equal to 45 minutes to less than or equal to 1.0 hour. After sintering the vaporized layer precursor to form the honeycomb body, the layer is a crystalline phase. For instance, FIG. 5A is an SEM image of a sintered, crystalline phase $5SiO_2.2Al_2O_3.2MgO$ ceramic layer deposited on a honeycomb body; FIG. 5B is an SEM image of a sintered, crystalline phase $2SiO_2.3Al_2O_3$ ceramic layer deposited on a honeycomb body; FIG. 5C is an SEM image of a sintered, crystalline phase $2SiO_2.5Al_2O_3.4MgO$ ceramic layer deposited on a honeycomb body; and FIG. 5D is an SEM image of a sintered, crystalline phase $Al_2O_3.MgO$ ceramic layer deposited on a honeycomb body. According to embodiments, the sintered, crystalline phase layers have a porosity, measured by SEM, of greater than 90%, such as greater than or equal to 91%, or greater than or equal to 92%. In other embodiments, the sintered, crystalline phase layer has a porosity of greater than or equal to 93%, such as greater than or equal to 94%, or greater than or equal to 95%. In still other embodiments, the sintered, crystalline phase layer has a porosity of greater than or equal to 96%, such as greater than or equal to 97%, or greater than or equal to 98%.

According to one or more embodiments of the disclosure, particulate filters are characterized by the filtration efficiency, representing their ability to remove a certain fraction of particulates from an incoming gas stream. The particulates can be characterized by their mass concentrations or their number concentrations. Both values typically correlate closely. Using a generic concentration $C_{Particulate}$ with the units particulate mass or number per unit volume, the filtration efficiency FE is typically obtained from the equation:

$$FE = \frac{[C_{Particulate}]_{Inlet} - [C_{Particulate}]_{Outlet}}{[C_{Particulate}]_{Inlet}} \qquad \text{Eqn. (1)}$$

There are different means for the experimental measurement of the filtration efficiency. A schematic for a generic laboratory setup is shown in FIG. 20. The generic laboratory setup comprises a gas supply, e.g. air, adjusted to a define flow rate, a particulate generator, for example one that generates soot particles at a certain rate and concentration, a filter sample to be tested, and two particulate analyzers at the inlet and the outlet of the filter samples.

The experiment is performed at controlled temperature, for example, room temperature. As used herein, "room temperature" refers to a temperature of 20° C.-. During the experiment, the gas flow is adjusted to a constant flow rate. Then particulates are added to the gas. Across the filter sample, a certain portion of the particulates are removed by filtration, which is measured as difference between the inlet and the outlet particle concentration. An example of such an experiment is shown in FIG. 21, for two experimental samples A and B made in accordance with the embodiments described herein plotted against a conventional sample (Comparative). In the example shown, the particles were soot particles generated on a soot generator and the volumetric flow rate was 21 m³/h. The testing was conducted at room temperature and atmospheric pressure. Plotted is the filtration efficiency calculated from the inlet and outlet concentration according to eqn. (1) vs. the time of the experiment. At time t=0 s the dosing of the particles starts and the filtration efficiency is recorded. For the different filter samples, different values in filtration efficiency are observed.

As shown in FIG. 21, the filtration efficiency in all cases increases with time. The reason for this is that the accumulated particles themselves, soot in this case, act as a filtration medium, enhancing the overall efficiency. To illustrate this more effectively it is helpful to plot the filtration as function of the accumulated soot mass instead of the time. The soot mass is obtained as the difference between the soot entering the filter and the soot mass leaving the filter integrated over time. The data from FIG. 21 in this format are provided in FIG. 22.

The filtration efficiency at the beginning, time equal t=0 s or 0 g/L soot load is usually called "clean" or "fresh" filtration efficiency and is determined only by the characteristics of the filter sample. Based on filtration theory the filtration process occurs based on different mechanism, primarily depending on the size of the particles. A common model to describe filtration media is the concept of an assembly of unit collectors. For the soot generated by the soot generator of the experiments described above, the dominating filtration mechanism is that based on Brownian motion of the small soot particles. The collection efficiency of a unit collector based on the Brownian motion mechanism $\eta_{BM}$ can be described by:

$$\eta_{BM} = 4 \cdot (A_s^{1/3}/Pe_i^{2/3}) \cdot (1-\varepsilon)^{2/3} \qquad \text{Eqn. (2)}$$

$A_s$ is a parameter, primarily dependent on the porosity $\varepsilon$ and $Pe_t$ being the Peclet number. The Peclet number is proportional to the fluid velocity inside the pore space $u_w/\varepsilon$ and the ratio between collector diameter $d_c$ and diffusion coefficient for Brownian motion $D_{BM}$.

$$Pe_i = \frac{u_w}{\varepsilon} \cdot \frac{d_c}{D_{BM,i}} \qquad \text{Eqn. (3)}$$

The particle size $d_s$ and temperature T dependence of this collection mechanism are introduced via the Brownian diffusion coefficient, $D_{BM} \sim (T/d_s^2)$. Combining all parameters that depend on the microstructure of the filtration medium into a single variable $K_{microstructure}$, eqn.(2) can be rewritten as Eqn. (4):

$$\eta_{BM} = K_{Microstructure} \cdot \left(\frac{D_{BM}}{u_w}\right)^{2/3} \qquad \text{Eqn. (4)}$$

The fluid velocity $u_w$ is determined from the volumetric flow rate divided by the cross-sectional area or filtration area. Thus, in addition to microstructural characteristics, the filtration performance at a given flow rate and particle size is proportional to the filtration area of a filter. Therefore, to compare materials with different microstructures, the filtration efficiency is normalized by the filtration area. For honeycomb wall flow filters with alternately plugged channels, the filtration surface area FSA in m² can be obtained from eqn. (5):

$$FSA = \frac{GSA}{2} \cdot V_{Filter} \qquad \text{Eqn. (5)}$$

In eqn. (5) GSA is the geometric surface area per volume of filter and $V_{Filter}$ is the volume of the filter sample. The factor ½ originates from the fact that only one half of the channels represent inlet channels through which the gas enters and then flows across the porous filter wall. Filtration area (or total filtration) would be total inlet cells area+total outlet cells area=total area. In other words, in eqn. (5), the total inlet cells area, which can be calculated by total area divided by 2 if the total inlet cells area=total outlet cells area. However, if the total inlet cells area is not equal to the total outlet cells area, the denominator in the equation would have to be modified to reflect this.

In addition to the filtration performance filters, are commonly characterized by their resistance to flow, usually referenced as pressure drop across the sample at a given volumetric gas flow rate. Often higher filtration performance coincides with an increased pressure drop or resistance to flow. From an application point of view, it is usually desirable to have an as low as possible pressure drop, as the pressure drop usually means pumping losses. In motor vehicle applications, this results in a reduction in power available to propel the vehicle or a reduction in fuel efficiency.

The pressure drop behavior of a filter sample is usually assessed by measuring the difference in pressure up and downstream of the filter sample at a given volumetric flow rate. In laboratory measurements this can be done at room temperature and at different flow rates.

According to one or more embodiments, the particulate filters prepared according to the embodiments described herein exhibit advantageously high filtration efficiencies normalized to filtration area of the inlet channels. Thus, according to one or more embodiments, the particulate filters described herein provide high filtration efficiency in a fresh (new) state, immediately after installation in vehicles in the factories of car manufacturers. In some embodiments, this high filtration efficiency is provided with a low pressure drop.

While the claims of the present disclosure are not to be limited by a particular theory, it is believed that the pressure drop of a particulate filters is composed of five primary factors. These factors include contraction and expansion of the gas flow at the inlet and outlet of the filter, friction losses of the gas flow along the inlet and outlet channel, and pressure drop of the gas flow across the porous channel walls.

In general, pressure drop across a filter is affected by macroscopic geometric parameters such as part diameter, length, hydraulic diameter of the channels and open frontal area as well as by the permeability of the porous filter wall. The latter is the only material characteristic and is defined by the microstructure, for example, the porosity, the effective pore size and the pore connectivity. Since the gas flow through the pores is laminar, the frictional losses across the wall are determined by the entire path across the porous wall.

The inlet and outlet contributions of the pressure drop can be described by $$\Delta p_{(1,5)} = (\zeta_{in} + \zeta_{out}) \cdot \rho_g \left( \frac{Q \cdot L}{V_{Filter} \cdot OFA} \right)^2 \quad \text{Eqn. (7)}$$

With $\Delta p$ as pressure drop, $\rho_g$ as density of the gas, Q as volume flow rate, $V_{Filter}$ as filter volume, L as length of the filter, OFA as open frontal area of the filter and $\zeta_{in}$ and $\zeta_{out}$ as empirical contraction and expansion coefficients, respectively.

For the pressure drop inside the filter the equation provided as eqn. (26) in SAE Technical Paper 2003-01-0842 can be used, presented as Eqn. (8) herein.

$$\Delta p_{(2,3,4)} = \frac{Q_{eff}}{2} \cdot \frac{\mu}{V_{Filter}} \cdot (d_h + t_w)^2 \cdot \left( \frac{t_w}{d_h \cdot \kappa_{effective}} + \frac{8 \cdot F \cdot L^2}{3 \cdot d_h^4} \right) \quad \text{Eqn. (8)}$$

With the new variables $\mu$ as dynamic viscosity, $Q_{eff}$ as effective volume flow rate, $d_h$ as hydraulic channel diameter, $t_w$ as wall thickness, F as friction factor (F=28.45 for square channels) and $\kappa_{effective}$ as effective permeability of the wall. The effective volume flow rate differs from the total flow rate by a factor that considers the flow rate distribution along the inlet and outlet channel. It was found empirically that $Q_{eff}=1.32*Q$ provides for a better description of experimental results.

The total pressure drop as measured in an experiment would be the sum of the contributions described by equation (7) and equation (8). In equation (7) and (8), all parameters are known and can be easily determined with the exception of the effective permeability of the wall material.

The effective permeability $\kappa_{effective}$ can be extracted from experimental data using equations (7) and (8). For this purpose, the pressure drop contribution due to inlet contraction and outlet expansion, eqn. (7), is subtracted from the experimental pressure drop value, providing for Eqn. (9)

$$\Delta p_{(2,3,4)} = \Delta p_{Experimental} - \Delta p_{(1,5)} \quad \text{Eqn. (9):}$$

Combining Eqn.(9) with Eqn.(8) and solving for the effective wall permeability $\kappa_{effective}$ yields:

$$\kappa_{effective} = \frac{t_w}{d_h} \cdot \left[ \frac{\Delta p_{Experimental} - \Delta p_{(1,5)}}{\frac{\mu \cdot Q_{eff}}{2 V_{Filter}} \cdot (d_h + t_w)^2} - \frac{8 \cdot F \cdot L^2}{3 \cdot d_h^4} \right]^{-1} \quad \text{Eqn. (10)}$$

The permeability of the porous wall of an extruded honeycomb body, $\kappa_0$, can usually be described reasonably well by the product of porosity $\varepsilon$ and the square of the effective median pore size $D_{50}$, both determined by mercury porosimetry, divided by 66.7:

$$\kappa_0 = \frac{\varepsilon \cdot D_{50}^2}{66.7} \quad \text{Eqn. (11)}$$

If coatings or other modifications are applied to the "as extruded" base wall portions of the porous wall with permeability $\kappa_0$ the permeability changes to a new effective permeability value, $\kappa_{effective}$, which can for example be determined using Eqn.(10) from experimental pressure drop values. This change in permeability relative to the permeability of the as extruded base wall portions of the honeycomb wall can also be described by a "Normalized Permeability Value (NPV)," describing the ratio of the effective permeability to the permeability of the non-modified original microstructure:

$$NPV = \kappa_{effective} / (\varepsilon D_{50}^2 / 66.7)_{bare} \quad \text{Eqn.(12)}$$

The experimental pressure drop measurement to determine $\Delta p_{Experimental}$ of a filter sample can be assessed by measuring the difference in pressure up and downstream of the filter sample at a given volumetric flow rate. In laboratory measurements this can be done at room temperature and at different flow rates.

As discussed above, particulate filters are characterized by the filtration efficiency, representing their ability to remove a certain fraction of particulates from an incoming gas stream. The particulates can be characterized by their mass concentrations or their number concentrations. Both values typically correlate closely. Using a generic concentration $C_{Particulate}$ with the units particulate mass or number per unit volume, the filtration efficiency FE is typically obtained from Eqn.(1) above.

Using the schematic for the generic laboratory setup is shown in FIG. 20, a particulate filter is tested at room temperature, a constant flow rate and then adding particulates are added to the gas. Across the filter sample, a certain portion of the particulates are removed by filtration, which is measured as difference between the inlet and the outlet particle concentration.

The filtration efficiency, as discussed above, at the beginning, time equal t=0 s or 0 g/L soot load is usually called "clean" or "fresh" filtration efficiency and is determined only by the characteristics of the filter sample. Based on filtration theory the filtration process occurs based on different mechanism, primarily depending on the size of the particles. A common model to describe filtration media is the concept of an assembly of unit collectors. For the soot generated by the soot generator of the experiments described above, the dominating filtration mechanism is that based on Brownian motion of the small soot particles. The collection efficiency of a unit collector based on the Brownian motion mechanism $\eta_{BM}$ can be described by Eqn. (2). As discussed above, the Peclet number is proportional to the fluid velocity inside the pore space $u_w/\varepsilon$ and the ratio between collector diameter $d_c$ and diffusion coefficient for Brownian motion $D_{BM}$ as shown by Eqn. (3) above.

SAE Technical Paper 2012-01-0363 explains that for an uncoated extruded filter with "random" porous microstructure, the clean filtration efficiency can be correlated to a filtration characteristic parameter $A_{Filt}$, which is proportional to microstructural as well as macroscopic filter properties, Eqn. (13):

$$A_{Filt} \sim \frac{\varepsilon^{0.43}}{D_{50}^{5/3}} \cdot \frac{t_w \cdot (CPSI)}{(Q/V_{Filter})^{2/3}} = EMF \cdot \frac{t_w \cdot (CPSI)}{(Q/V_{Filter})^{2/3}} \quad \text{Eqn. (13)}$$

As new variables, Eqn. (13) has CPSI as cell density of the filter structure. A correlation between the clean filtration efficiency and this filtration characteristic parameter ($A_{FILT}$)

can be plotted on a graph with clean filtration efficiency on the Y axis and the filtration characteristic parameter ($A_{FILT}$) on the X axis.

The contribution from the microstructural parameters, porosity and median pore size can be combined to an Effective Microstructure Factor, EMF. For materials for which the effective porosity and median pore size are not known, this new parameter can be used to characterize the effective properties of the microstructure. This variable also allows consideration of in real microstructures, that the filtration does not necessarily occur along the entire length of the pore across the filter wall, but rather to a larger extent locally at locations where favorable conditions exist for the collection and deposition of particles, e.g. passages with a narrow opening ("pore neck"). As soon as some particles are collected they further narrow this pore neck, accelerating the filtration process further. Thus, the new parameter allows for consideration of microstructures which are non-homogeneous and do not have a random pore design.

Analogous to what has been done for pressure drop, it is also useful to consider not only the new microstructure parameter EMF, but also normalize it for the properties of the base microstructure of the base wall portions of the as extruded filter body with random microstructure. For the latter the EMF is obtained as ratio of porosity $\varepsilon^{0.43}$ divided by the median pore size $D_{50}$ to the power of 5/3. Through this normalization we obtain the new Normalized Microstructure Filtration Value, NMFV, to describe the filtration characteristics of a microstructure as: Eqn.(14): $NMFV = EMF/(\varepsilon^{0.43}/D_{50}^{5/3})_{base\ wall\ properties}$ According to one or more embodiments, particulate filters are provided that yield a favorable (e.g. high) Normalized Permeability Value (NPV) while, at the same time, provide for an increase in the Normalized Microstructure Filtration Value (NMFV), e.g. materials that provide for low (change) in pressure drop combined with increased clean filtration.

The filtration efficiency as well as the pressure drop performance as described above were tested over a wide range of filter samples as well as for a number of samples made in accordance with the present disclosure with a composite microstructure of porous wall surfaces defining the inlet channels, namely, inlet channels are comprised of the filtration material deposits as described according to one or more embodiments herein. For filtration, the initial or clean filtration efficiency in % is considered at a flow rate of 21 m³/h. The pressure drop was assessed at room temperature and the highest flow rate of 357 m³/h.

Honeycomb bodies and methods of making honeycomb bodies have been described herein. In embodiments, the honeycomb bodies comprise a layer onto at least one surface of a honeycomb body. The layer, in embodiments, has a crystalline structure, porosity, such as greater than or equal to 50%, and the layer is applied as a thin layer, such as having a thickness of greater than or equal to 0.5 μm to less than or equal to 10 μm. It should be understood that in various of the embodiments described above a "honeycomb body" may be a ceramic "honeycomb body" and a "layer" may be a ceramic "layer."

Numbered embodiments as disclosed and described herein are now provided.

EXAMPLES

Embodiments will be further clarified by the following examples.

Example 1

Characteristics of a porous inorganic layer in a particulate filter that result in high filtration efficiency and low pressure drop are presented. Defining $P_0$ and $FE_0$ as the clean pressure drop and clean filtration efficiency performance of an underlying porous ceramic honeycomb body (no porous inorganic layer present); and $P_1$ and $FE_1$ as the clean pressure drop and clean filtration efficiency performance of a clean honeycomb filter body, which comprises the porous ceramic honeycomb body and porous inorganic layer, the impact of the layer on filter performance is characterized by parameter $X=(FE-FE_0)P_0/(P-P_0)/FE_0$. In defining the parameter X, clean state of the particulate filter represent the state having close to zero soot loading. In some embodiments, the performance of the particulate filter with the layer is described as X>2. In other embodiments, the performance of the particulate filter with the layer is described as X>3. In still other embodiments, the performance of the particulate filter with the layer is described as X>4. In yet other embodiments, the performance of the particulate filter with the layer is described as X>5. In some embodiments, the particulate filter pressure drop increase as a result of the layer is less than 25%. In other embodiments, the particulate filter pressure drop increase as a result of the layer is less than 20%. In still other embodiments, the particulate filter pressure drop increase as a result of the layer is less than 10%. Defining the porous inorganic layer morphology parameter Y as Y=(Layer Porosity^(6.5/Sqrt(Layer Particle Size)))*(1−Layer Porosity)/Sqrt(Layer Particle Size), it is shown that there is a good correlation between layer morphology parameter Y and particulate filter with layer performance parameter X. Based on these results, in some embodiments, the layer morphology parameter Y is greater than 0.03. In some other embodiments, the layer morphology parameter Y is greater than 0.04. In still other embodiments, the layer morphology parameter Y is greater than 0.05.

Embodiments analyzed by way of modeling are listed in Table 1. The embodiments of Table 1 represent a gasoline particulate filter having different combinations of porosity, pore size and layer thickness for a gasoline particulate filter of 5.66" in diameter and 6" in length, having CPSI of 200, wall thickness of 8.5 microns, wall porosity of 56%, wall mean pore size of 13 microns. The filtration efficiency and pressure drop performance was evaluated for exhaust flow rate of 100 kg/hr and 450° C.

TABLE 1

| Membrane layer Particle Size (microns) | Membrane Layer Porosity | Membrane Layer thickness (microns) | Clean dP at 100 kg/hr at 450 C. 9 kPa) | dP % increase | Mass based FE for 0 g/L for 85 nm mean soot particle size | $(FE_1 - FE_0)*P_0/(P_1 - P_0)/FE_0$ |
|---|---|---|---|---|---|---|
| 0.5 | 0.6 | 0 | 0.674 | 0 | 39.7 | |
| 0.5 | 0.6 | 3.5 | 1.857 | 175.5 | 99.4 | 0.8568 |
| 0.5 | 0.6 | 7 | 3.101 | 360.1 | 99.9 | 0.4211 |
| 0.5 | 0.65 | 3.5 | 1.459 | 116.5 | 97.8 | 1.2565 |
| 0.5 | 0.65 | 7 | 2.28 | 238.3 | 99.9 | 0.6364 |

TABLE 1-continued

| Membrane layer Particle Size (microns) | Membrane Layer Porosity | Membrane Layer thickness (microns) | Clean dP at 100 kg/hr at 450 C. 9 kPa) | dP % increase | Mass based FE for 0 g/L for 85 nm mean soot particle size | $(FE_1 - FE_0)*P_0/(P_1-P_0)/FE_0$ |
|---|---|---|---|---|---|---|
| 0.5 | 0.7 | 3.5 | 1.17 | 73.6 | 94.3 | 1.8689 |
| 0.5 | 0.7 | 7 | 1.708 | 153.4 | 99.4 | 0.9802 |
| 0.5 | 0.8 | 3.5 | 0.861 | 27.7 | 80.09 | 3.6669 |
| 0.5 | 0.8 | 7 | 1.058 | 57.0 | 93.42 | 2.3751 |
| 0.5 | 0.9 | 3.5 | 0.727 | 7.9 | 59.31 | 6.2816 |
| 0.5 | 0.9 | 7 | 0.783 | 16.2 | 72.52 | 5.1119 |
| 0.5 | 0.95 | 3.5 | 0.695 | 3.1 | 48.54 | 7.1466 |
| 0.5 | 0.95 | 7 | 0.718 | 6.5 | 56.41 | 6.4475 |
| 1 | 0.6 | 3.5 | 1.032 | 53.1 | 78.72 | 1.8504 |
| 1 | 0.6 | 7 | 1.407 | 108.8 | 92.49 | 1.2227 |
| 1 | 0.65 | 3.5 | 0.908 | 34.7 | 71.91 | 2.3369 |
| 1 | 0.65 | 7 | 1.154 | 71.2 | 86.91 | 1.6698 |
| 1 | 0.7 | 3.5 | 0.824 | 22.3 | 65.42 | 2.9110 |
| 1 | 0.7 | 7 | 0.983 | 45.8 | 80.61 | 2.2477 |
| 1 | 0.8 | 3.5 | 0.732 | 8.6 | 54.18 | 4.2385 |
| 1 | 0.8 | 7 | 0.793 | 17.7 | 65.16 | 3.6323 |
| 1 | 0.9 | 3.5 | 0.693 | 2.8 | 45.6 | 5.2719 |
| 1 | 0.9 | 7 | 0.712 | 5.6 | 50.89 | 4.9994 |
| 1 | 0.95 | 3.5 | 0.683 | 1.3 | 42.3 | 4.9046 |
| 1 | 0.95 | 7 | 0.693 | 2.8 | 44.75 | 4.5124 |
| 2 | 0.6 | 3.5 | 0.776 | 15.1 | 53.35 | 2.2720 |
| 2 | 0.6 | 7 | 0.883 | 31.0 | 63.89 | 1.9650 |
| 2 | 0.65 | 3.5 | 0.741 | 9.9 | 50.33 | 2.6936 |
| 2 | 0.65 | 7 | 0.812 | 20.5 | 59.07 | 2.3830 |
| 2 | 0.7 | 3.5 | 0.718 | 6.5 | 47.84 | 3.1408 |
| 2 | 0.7 | 7 | 0.764 | 13.4 | 54.86 | 2.8597 |
| 2 | 0.8 | 3.5 | 0.692 | 2.7 | 44.07 | 4.1217 |
| 2 | 0.8 | 7 | 0.713 | 5.8 | 48.09 | 3.6523 |
| 2 | 0.9 | 3.5 | 0.682 | 1.2 | 41.46 | 3.7350 |
| 2 | 0.9 | 7 | 0.691 | 2.5 | 43.13 | 3.4254 |
| 2 | 0.95 | 3.5 | 0.68 | 0.9 | 40.49 | 2.2353 |
| 2 | 0.95 | 7 | 0.685 | 1.6 | 41.23 | 2.3614 |
| 3 | 0.6 | 3.5 | 0.723 | 7.3 | 46.48 | 2.3491 |
| 3 | 0.6 | 7 | 0.775 | 15.0 | 52.48 | 2.1482 |
| 3 | 0.65 | 3.5 | 0.707 | 4.9 | 44.9 | 2.6752 |
| 3 | 0.65 | 7 | 0.742 | 10.1 | 49.75 | 2.5091 |
| 3 | 0.7 | 3.5 | 0.696 | 3.3 | 43.74 | 3.1177 |
| 3 | 0.7 | 7 | 0.72 | 6.8 | 47.47 | 2.8677 |
| 3 | 0.8 | 3.5 | 0.685 | 1.6 | 41.88 | 3.3646 |
| 3 | 0.8 | 7 | 0.696 | 3.3 | 43.94 | 3.2720 |
| 3 | 0.9 | 3.5 | 0.68 | 0.9 | 40.59 | 2.5183 |
| 3 | 0.9 | 7 | 0.686 | 1.8 | 41.34 | 2.3202 |
| 3 | 0.95 | 3.5 | 0.679 | 0.7 | 40.13 | 1.4601 |
| 3 | 0.95 | 7 | 0.684 | 1.5 | 40.48 | 1.3242 |
| 4 | 0.6 | 3.5 | 0.704 | 4.5 | 43.8 | 2.3202 |
| 4 | 0.6 | 7 | 0.735 | 9.1 | 47.6 | 2.1987 |
| 4 | 0.65 | 3.5 | 0.695 | 3.1 | 42.9 | 2.5870 |
| 4 | 0.65 | 7 | 0.716 | 6.2 | 45.9 | 2.5062 |
| 4 | 0.7 | 3.5 | 0.689 | 2.2 | 42.1 | 2.7164 |
| 4 | 0.7 | 7 | 0.704 | 4.5 | 44.5 | 2.7164 |
| 4 | 0.8 | 3.5 | 0.682 | 1.2 | 41.04 | 2.8437 |
| 4 | 0.8 | 7 | 0.69 | 2.4 | 42.31 | 2.7694 |
| 4 | 0.9 | 3.5 | 0.679 | 0.7 | 40.26 | 1.9015 |
| 4 | 0.9 | 7 | 0.685 | 1.6 | 40.77 | 1.6514 |
| 4 | 0.95 | 3.5 | 0.678 | 0.6 | 39.96 | 1.1035 |
| 4 | 0.95 | 7 | 0.683 | 1.3 | 40.19 | 0.9243 |

Figure 6:
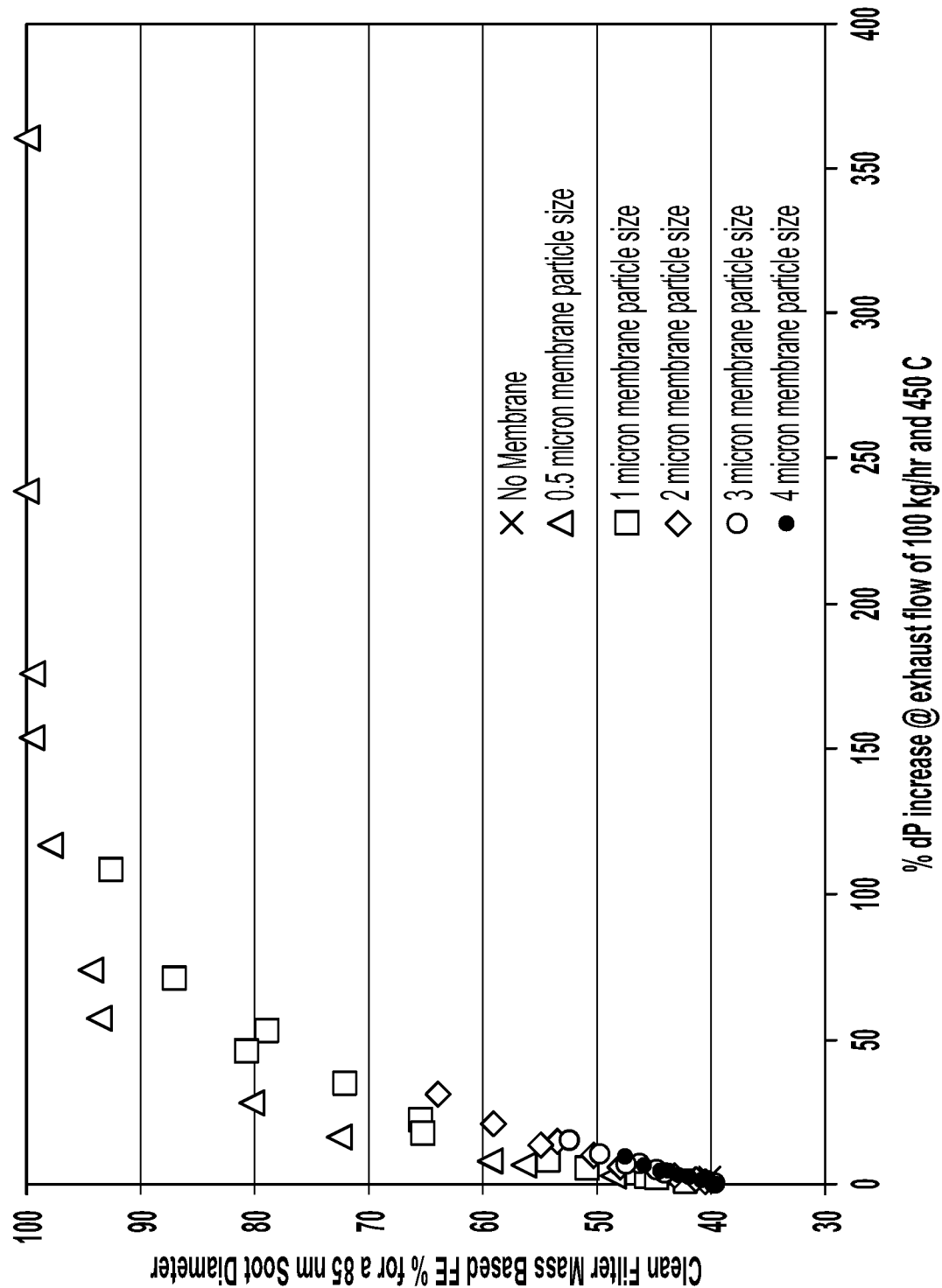
FIGS. 6-7 are graphs of filtration efficiency versus pressure drop increase for embodiments.
Figure 7:
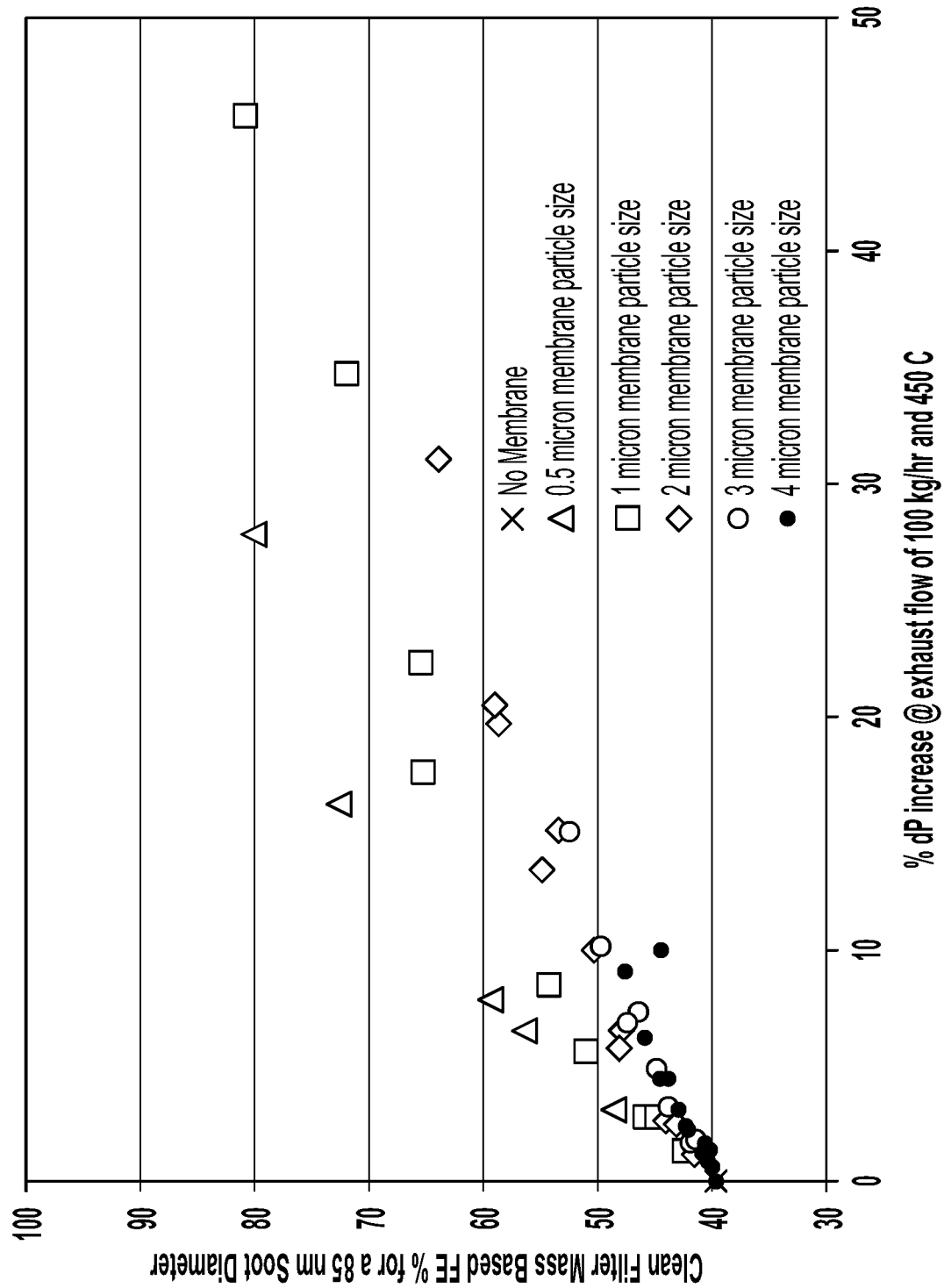

In FIGS. 6-7, graphs of filtration efficiency and pressure drop increase for the embodiments of Table 1 are provided. FIG. 7 shows FIG. 6 up to 50% increase in pressure drop.

Figure 8:
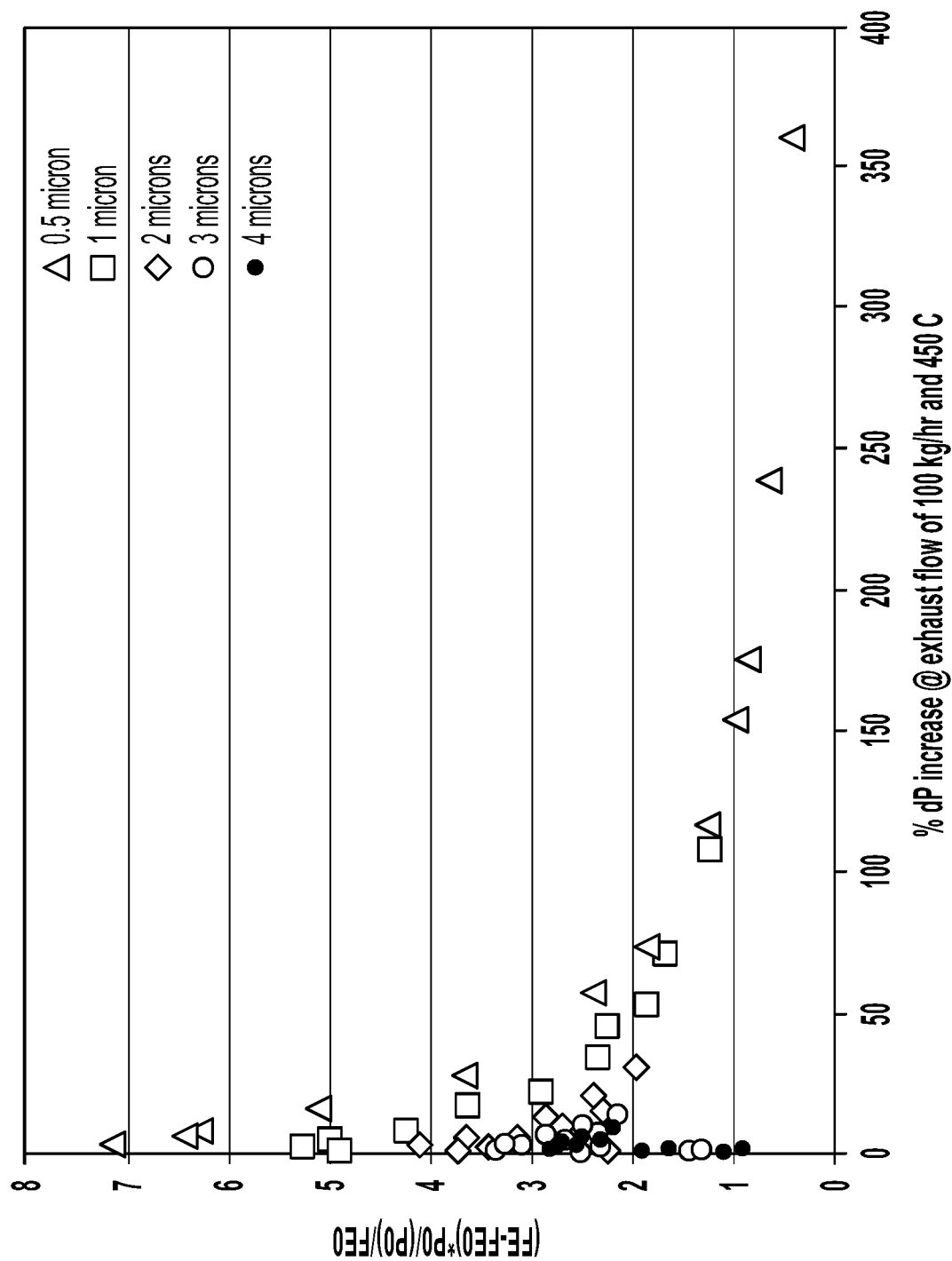
FIGS. 8-9 are graphs of parameter "X" versus pressure drop increase for embodiments.
Figure 9:
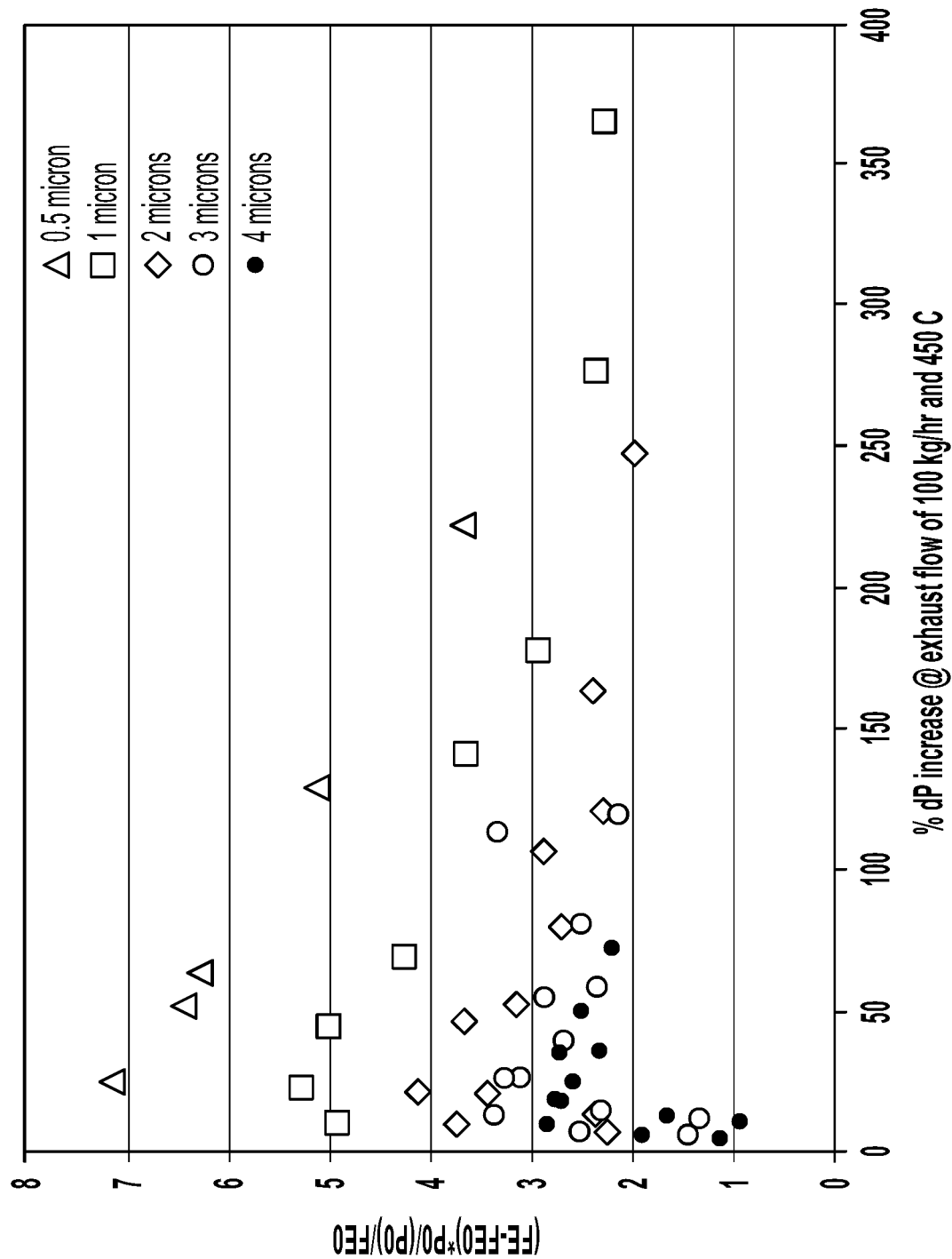

FIGS. 8-9 are graphs of parameter "X" versus pressure drop for the embodiments of Table 1. The performance of the particulate filter with membrane is characterized by the performance parameter X defined as X=(FE−FE0)*P0/FE0/(P−P0). FIG. 9 shows FIG. 8 up to 50% increase in pressure drop.

Figure 10:
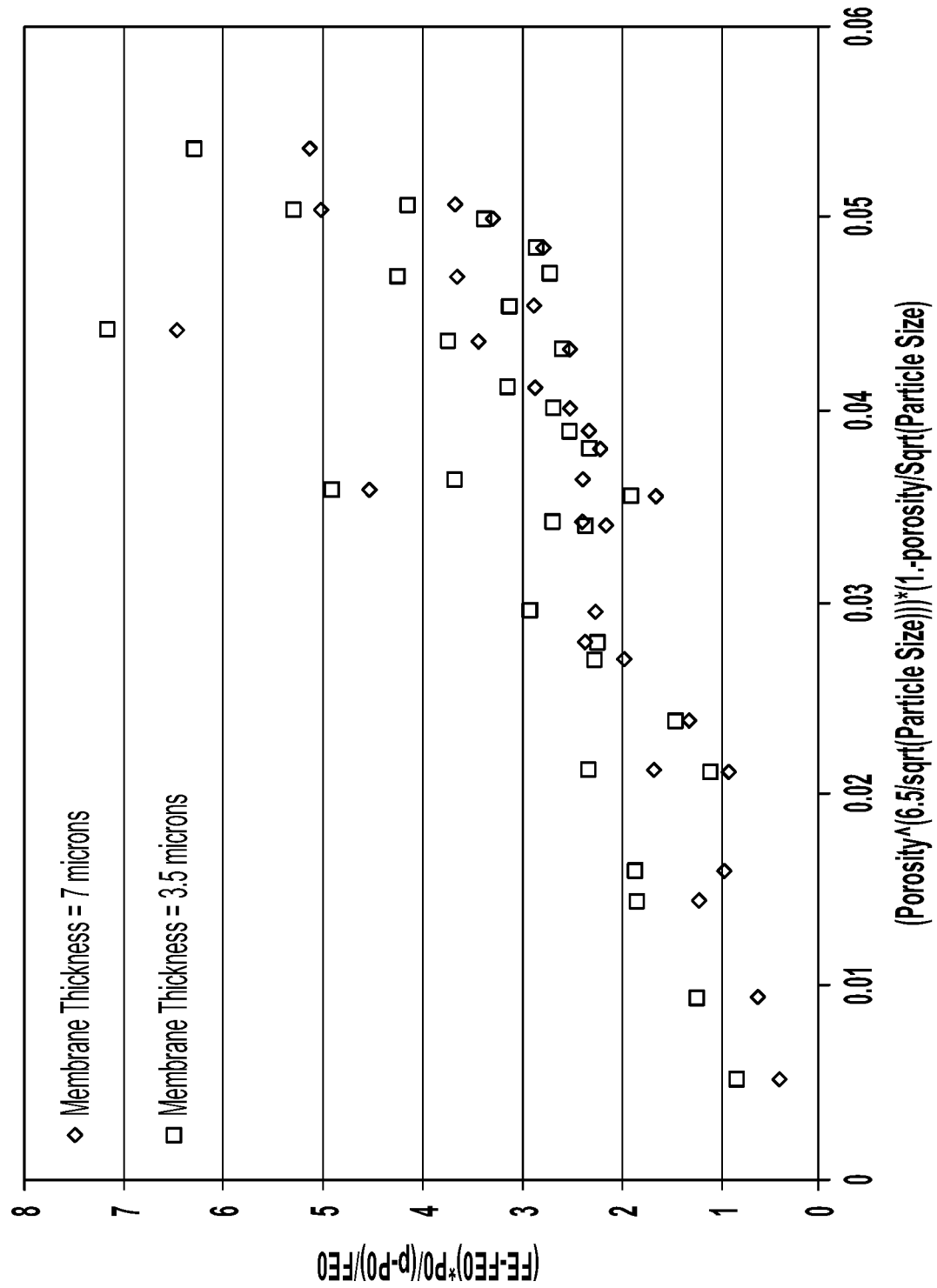
FIG. 10 is a graph of parameter "X" versus parameter "Y" increase for embodiments.

FIG. 10 is the correlation between membrane morphology parameter Y=(Membrane Porosity^(6.5/Sqrt(Membrane Particle Size)))*(1−Membrane Porosity)/Sqrt(Membrane Particle Size) and Particulate Filter Performance parameter X=$(FE_1-FE_0)*P_0/FE_0/(P_1-P_0)$ for the embodiments of Table 1.

Example 2

Characteristics of a porous inorganic layer in a particulate filter that partially covers the filter channels and result in high filtration efficiency and low pressure drop are presented. Defining $P_0$ and $FE_0$ as the clean pressure drop and filtration efficiency performance of an underlying porous ceramic honeycomb body (no porous inorganic layer present); and $P_1$ and $FE_1$ as the clean pressure drop and clean filtration efficiency performance of a clean honeycomb filter body, which comprises the porous ceramic honeycomb body and porous inorganic layer, the impact of the layer on particulate filter performance is characterized by parameter $X=(FE-FE_0)P_0/(P-P_0)/FE_0$. In defining the parameter $X$, clean state of the particulate filter represent the state having close to zero soot loading. In some embodiments, the performance of the particulate filter with the layer is described as $X>1.7$. In other embodiments, the performance of the particulate filter with the layer is described as $X>2$. In still other embodiments, the performance of the particulate filter with the layer is described as $X>3$. In yet other embodiments, the performance of the particulate filter with the layer is described as $X>4$. In some embodiments, the particulate filter pressure drop increase as a result of the layer is less than 25%. In other embodiments, the particulate filter pressure drop increase as a result of the layer is less than 20%. In still other embodiments, the particulate filter pressure drop increase as a result of the layer is less than 10%. In some embodiments, the porous inorganic layer coverage of the channel wall is larger than 70%. In other embodiments, the porous inorganic layer coverage of the channel wall is larger than 80%. In still other embodiments, the porous inorganic layer coverage of the channel wall is larger than 90%.

Embodiments analyzed by way of modeling are listed in Table 2. The embodiments of Table 2 represent a gasoline particulate filter having different combinations of layer coverage, porosity, pore size and layer thickness for a gasoline particulate filter of 5.66" in diameter and 6" in length, having CPSI of 200, wall thickness of 8.5 microns, wall porosity of 56%, wall mean pore size of 13 microns. The filtration efficiency and pressure drop performance was evaluated for exhaust flow rate of 100 kg/hr and 450° C.

Figure 11:
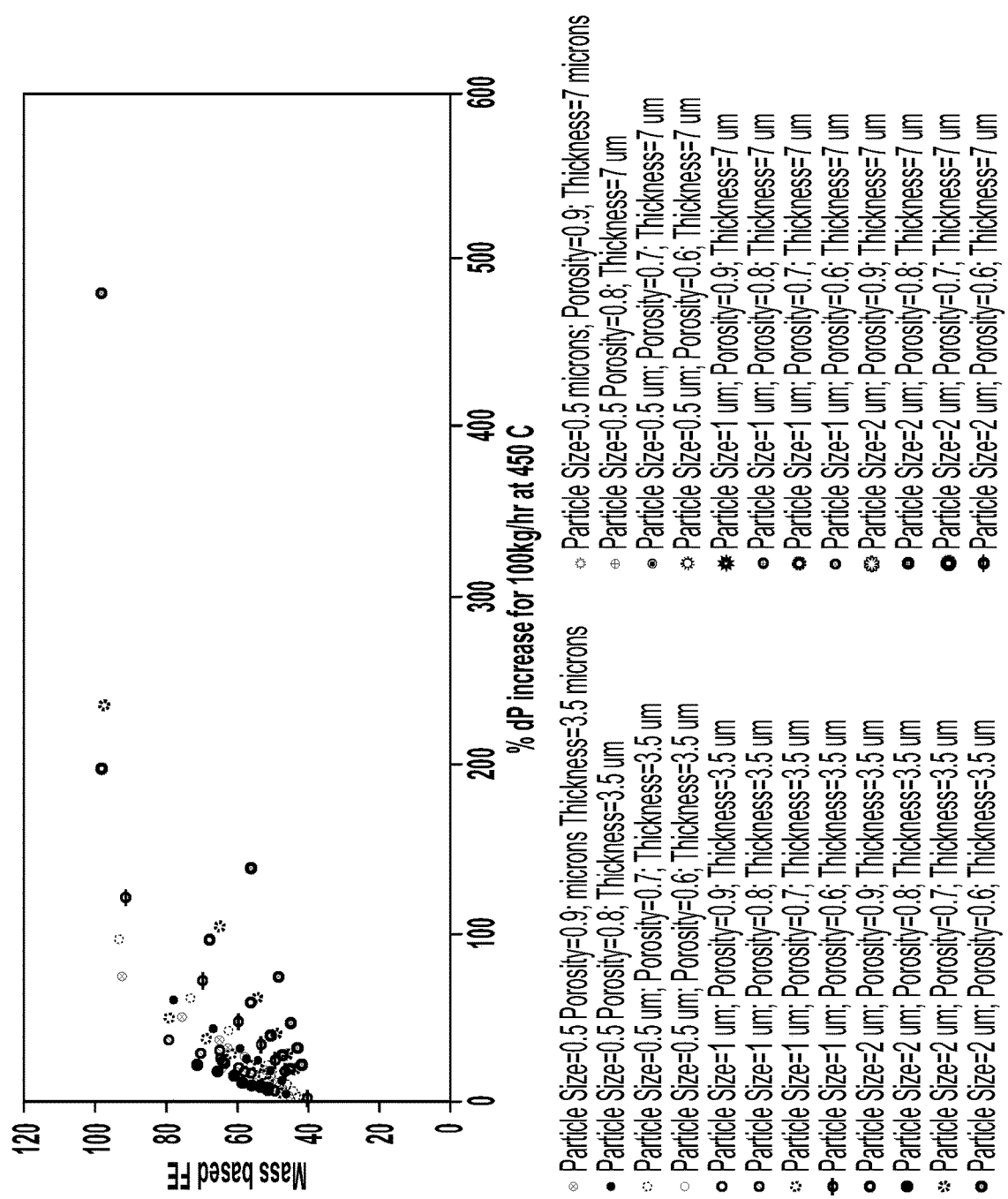
FIGS. 11-12 are graphs of filtration efficiency versus pressure drop increase for embodiments.
Figure 12:
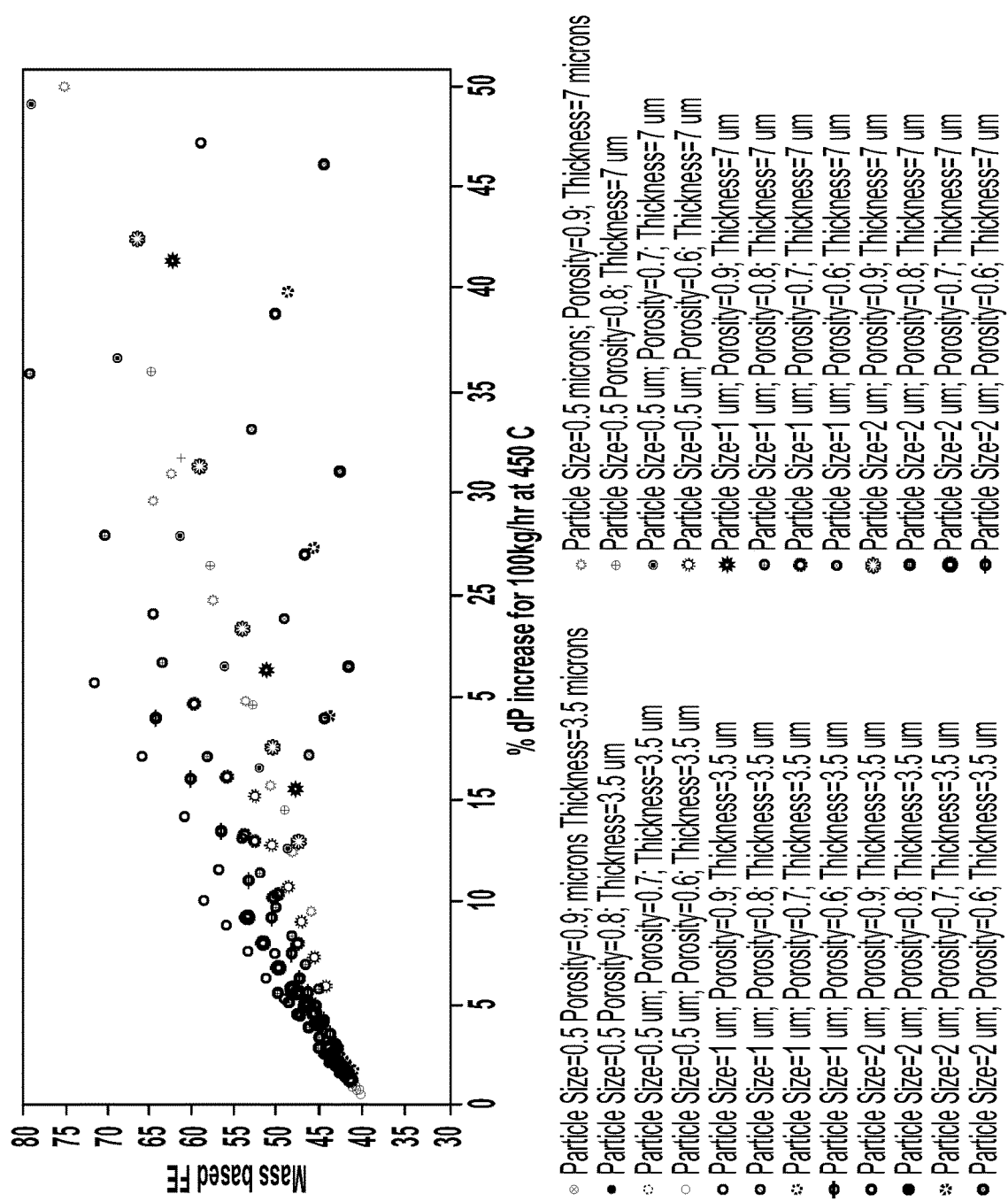

In FIGS. 11-12, graphs of filtration efficiency and pressure drop increase for the embodiments of Table 2 are provided. FIG. 12 shows FIG. 11 up to 50% increase in pressure drop.

TABLE 2

| Membrane layer Particle Size (microns) | Membrane Layer Porosity | Degree of Coverage | Membrane Layer thickness (microns) | Clean dP at 100 kg/hr at 450 C. (kPa) | Mass based FE for 0 g/L for 85 nm mean soot particle size | % dP Increase | $(FE_1-FE_0)*P_0/(P_1-P_0)/FE_0$ |
|---|---|---|---|---|---|---|---|
| 0.5 | 0.9 | 1   | 0   | 0.584  | 39.74 | 0      |       |
| 0.5 | 0.9 | 1   | 3.5 | 0.642  | 58.9  | 9.93   | 4.855 |
| 0.5 | 0.9 | 0.9 | 3.5 | 0.6348 | 56.23 | 8.70   | 4.770 |
| 0.5 | 0.9 | 0.8 | 3.5 | 0.6275 | 53.75 | 7.45   | 4.733 |
| 0.5 | 0.9 | 0.7 | 3.5 | 0.62   | 51.46 | 6.16   | 4.784 |
| 0.5 | 0.9 | 0.6 | 3.5 | 0.614  | 49.34 | 5.14   | 4.703 |
| 0.5 | 0.9 | 0.5 | 3.5 | 0.6089 | 47.38 | 4.26   | 4.509 |
| 0.5 | 0.9 | 1   | 7   | 0.704  | 71.86 | 20.55  | 3.934 |
| 0.5 | 0.9 | 0.9 | 7   | 0.683  | 66.17 | 16.95  | 3.923 |
| 0.5 | 0.9 | 0.8 | 7   | 0.666  | 61.34 | 14.04  | 3.871 |
| 0.5 | 0.9 | 0.7 | 7   | 0.651  | 57.18 | 11.47  | 3.825 |
| 0.5 | 0.9 | 0.6 | 7   | 0.638  | 53.57 | 9.25   | 3.764 |
| 0.5 | 0.9 | 0.5 | 7   | 0.627  | 50.39 | 7.36   | 3.640 |
| 0.5 | 0.8 | 1   | 3.5 | 0.792  | 79.84 | 35.62  | 2.833 |
| 0.5 | 0.8 | 0.9 | 3.5 | 0.746  | 70.81 | 27.74  | 2.818 |
| 0.5 | 0.8 | 0.8 | 3.5 | 0.71   | 63.95 | 21.58  | 2.824 |
| 0.5 | 0.8 | 0.7 | 3.5 | 0.683  | 58.56 | 16.95  | 2.794 |
| 0.5 | 0.8 | 0.6 | 3.5 | 0.661  | 54.22 | 13.18  | 2.764 |
| 0.5 | 0.8 | 0.5 | 3.5 | 0.643  | 50.65 | 10.10  | 2.717 |
| 0.5 | 0.8 | 1   | 7   | 1.01   | 93.17 | 72.95  | 1.843 |
| 0.5 | 0.8 | 0.9 | 7   | 0.875  | 75.99 | 49.83  | 1.831 |
| 0.5 | 0.8 | 0.8 | 7   | 0.793  | 65.49 | 35.79  | 1.811 |
| 0.5 | 0.8 | 0.7 | 7   | 0.738  | 58.4  | 26.37  | 1.781 |
| 0.5 | 0.8 | 0.6 | 7   | 0.698  | 53.3  | 19.52  | 1.748 |
| 0.5 | 0.8 | 0.5 | 7   | 0.668  | 49.45 | 14.38  | 1.699 |
| 0.5 | 0.7 | 1   | 3.5 | 1.14   | 94.2  | 95.21  | 1.439 |
| 0.5 | 0.7 | 0.9 | 3.5 | 0.936  | 73.79 | 60.27  | 1.422 |
| 0.5 | 0.7 | 0.8 | 3.5 | 0.825  | 63.04 | 41.27  | 1.421 |
| 0.5 | 0.7 | 0.7 | 3.5 | 0.756  | 65.2  | 29.45  | 2.175 |
| 0.5 | 0.7 | 0.6 | 3.5 | 0.708  | 51.52 | 21.23  | 1.396 |
| 0.5 | 0.7 | 0.5 | 3.5 | 0.674  | 48.1  | 15.41  | 1.365 |
| 0.5 | 0.7 | 1   | 7   | 1.726  | 99.3  | 195.55 | 0.766 |
| 0.5 | 0.7 | 0.9 | 7   | 1.139  | 68.3  | 95.03  | 0.756 |
| 0.5 | 0.7 | 0.8 | 7   | 0.9229 | 56.8  | 58.03  | 0.740 |
| 0.5 | 0.7 | 0.7 | 7   | 0.81   | 50.85 | 38.70  | 0.722 |
| 0.5 | 0.7 | 0.6 | 7   | 0.741  | 47.19 | 26.88  | 0.697 |
| 0.5 | 0.7 | 0.5 | 7   | 0.694  | 44.72 | 18.84  | 0.665 |
| 0.5 | 0.6 | 1   | 3.5 | 1.95   | 98.7  | 233.90 | 0.634 |
| 0.5 | 0.6 | 0.9 | 3.5 | 1.189  | 65.58 | 103.60 | 0.628 |
| 0.5 | 0.6 | 0.8 | 3.5 | 0.939  | 54.74 | 60.79  | 0.621 |
| 0.5 | 0.6 | 0.7 | 3.5 | 0.816  | 49.4  | 39.73  | 0.612 |
| 0.5 | 0.6 | 0.6 | 3.5 | 0.743  | 46.23 | 27.23  | 0.600 |
| 0.5 | 0.6 | 0.5 | 3.5 | 0.695  | 44.12 | 19.01  | 0.580 |
| 0.5 | 0.6 | 1   | 7   | 3.374  | 99.98 | 477.74 | 0.317 |
| 0.5 | 0.6 | 0.9 | 7   | 1.391  | 56.8  | 138.18 | 0.311 |
| 0.5 | 0.6 | 0.8 | 7   | 1.013  | 48.59 | 73.46  | 0.303 |
| 0.5 | 0.6 | 0.7 | 7   | 0.853  | 45.11 | 46.06  | 0.293 |
| 0.5 | 0.6 | 0.6 | 7   | 0.765  | 43.18 | 30.99  | 0.279 |
| 0.5 | 0.6 | 0.5 | 7   | 0.709  | 41.96 | 21.40  | 0.261 |
| 1   | 0.9 | 1   | 3.5 | 0.6    | 45.2  | 2.74   | 5.015 |

TABLE 2-continued

| Membrane layer Particle Size (microns) | Membrane Layer Porosity | Degree of Coverage | Membrane Layer thickness (microns) | Clean dP at 100 kg/hr at 450 C. (kPa) | Mass based FE for 0 g/L for 85 nm mean soot particle size | % dP Increase | $(FE_1-FE_0)*P_0/(P_1-P_0)/FE_0$ |
|---|---|---|---|---|---|---|---|
| 1 | 0.9 | 0.9 | 3.5 | 0.598 | 44.5 | 2.40 | 4.996 |
| 1 | 0.9 | 0.8 | 3.5 | 0.596 | 43.93 | 2.05 | 5.131 |
| 1 | 0.9 | 0.7 | 3.5 | 0.595 | 43.31 | 1.88 | 4.769 |
| 1 | 0.9 | 0.6 | 3.5 | 0.593 | 42.71 | 1.54 | 4.850 |
| 1 | 0.9 | 0.5 | 3.5 | 0.592 | 42.12 | 1.37 | 4.372 |
| 1 | 0.9 | 1 | 7 | 0.616 | 50.09 | 5.48 | 4.753 |
| 1 | 0.9 | 0.9 | 7 | 0.613 | 48.76 | 4.97 | 4.571 |
| 1 | 0.9 | 0.8 | 7 | 0.6096 | 47.79 | 4.38 | 4.621 |
| 1 | 0.9 | 0.7 | 7 | 0.606 | 46.27 | 3.77 | 4.362 |
| 1 | 0.9 | 0.6 | 7 | 0.603 | 45.11 | 3.25 | 4.153 |
| 1 | 0.9 | 0.5 | 7 | 0.6 | 43.99 | 2.74 | 3.903 |
| 1 | 0.8 | 1 | 3.5 | 0.637 | 53.78 | 9.08 | 3.893 |
| 1 | 0.8 | 0.9 | 3.5 | 0.63 | 51.84 | 7.88 | 3.866 |
| 1 | 0.8 | 0.8 | 3.5 | 0.623 | 50.04 | 6.68 | 3.881 |
| 1 | 0.8 | 0.7 | 3.5 | 0.617 | 48.37 | 5.65 | 3.843 |
| 1 | 0.8 | 0.6 | 3.5 | 0.612 | 46.82 | 4.79 | 3.716 |
| 1 | 0.8 | 0.5 | 3.5 | 0.607 | 45.37 | 3.94 | 3.597 |
| 1 | 0.8 | 1 | 7 | 0.694 | 64.77 | 18.84 | 3.344 |
| 1 | 0.8 | 0.9 | 7 | 0.677 | 60.54 | 15.92 | 3.287 |
| 1 | 0.8 | 0.8 | 7 | 0.662 | 56.88 | 13.36 | 3.229 |
| 1 | 0.8 | 0.7 | 7 | 0.648 | 53.7 | 10.96 | 3.205 |
| 1 | 0.8 | 0.6 | 7 | 0.637 | 50.91 | 9.08 | 3.097 |
| 1 | 0.8 | 0.5 | 7 | 0.627 | 48.43 | 7.36 | 2.970 |
| 1 | 0.7 | 1 | 3.5 | 0.724 | 65.05 | 23.97 | 2.657 |
| 1 | 0.7 | 0.9 | 3.5 | 0.698 | 60.25 | 19.52 | 2.644 |
| 1 | 0.7 | 0.8 | 3.5 | 0.6773 | 56.29 | 15.98 | 2.607 |
| 1 | 0.7 | 0.7 | 3.5 | 0.659 | 52.97 | 12.84 | 2.592 |
| 1 | 0.7 | 0.6 | 3.5 | 0.644 | 50.15 | 10.27 | 2.550 |
| 1 | 0.7 | 0.5 | 3.5 | 0.63 | 47.73 | 7.88 | 2.553 |
| 1 | 0.7 | 1 | 7 | 0.87 | 79.86 | 48.97 | 2.061 |
| 1 | 0.7 | 0.9 | 7 | 0.797 | 69.37 | 36.47 | 2.044 |
| 1 | 0.7 | 0.8 | 7 | 0.746 | 62.03 | 27.74 | 2.022 |
| 1 | 0.7 | 0.7 | 7 | 0.709 | 56.61 | 21.40 | 1.983 |
| 1 | 0.7 | 0.6 | 7 | 0.68 | 52.44 | 16.44 | 1.944 |
| 1 | 0.7 | 0.5 | 7 | 0.657 | 49.13 | 12.50 | 1.890 |
| 1 | 0.6 | 1 | 3.5 | 0.931 | 78.45 | 59.42 | 1.639 |
| 1 | 0.6 | 0.9 | 3.5 | 0.831 | 67.15 | 42.29 | 1.631 |
| 1 | 0.6 | 0.8 | 3.5 | 0.766 | 59.78 | 31.16 | 1.618 |
| 1 | 0.6 | 0.7 | 3.5 | 0.72 | 54.58 | 23.29 | 1.604 |
| 1 | 0.6 | 0.6 | 3.5 | 0.686 | 50.73 | 17.47 | 1.583 |
| 1 | 0.6 | 0.5 | 3.5 | 0.659 | 47.75 | 12.84 | 1.569 |
| 1 | 0.6 | 1 | 7 | 1.286 | 92.34 | 120.21 | 1.101 |
| 1 | 0.6 | 0.9 | 7 | 0.999 | 70.47 | 71.06 | 1.088 |
| 1 | 0.6 | 0.8 | 7 | 0.859 | 59.88 | 47.09 | 1.076 |
| 1 | 0.6 | 0.7 | 7 | 0.777 | 53.63 | 33.05 | 1.058 |
| 1 | 0.6 | 0.6 | 7 | 0.723 | 49.51 | 23.80 | 1.033 |
| 1 | 0.6 | 0.5 | 7 | 0.684 | 46.59 | 17.12 | 1.007 |
| 2 | 0.9 | 1 | 3.5 | 0.589 | 41.08 | 0.86 | 3.938 |
| 2 | 0.9 | 0.9 | 3.5 | 0.589 | 40.9 | 0.86 | 3.409 |
| 2 | 0.9 | 0.8 | 3.5 | 0.588 | 40.72 | 0.68 | 3.600 |
| 2 | 0.9 | 0.7 | 3.5 | 0.588 | 40.55 | 0.68 | 2.976 |
| 2 | 0.9 | 0.6 | 3.5 | 0.5878 | 40.38 | 0.65 | 2.475 |
| 2 | 0.9 | 0.5 | 3.5 | 0.587 | 40.2 | 0.51 | 2.253 |
| 2 | 0.9 | 1 | 7 | 0.598 | 42.74 | 2.40 | 3.149 |
| 2 | 0.9 | 0.9 | 7 | 0.597 | 42.38 | 2.23 | 2.984 |
| 2 | 0.9 | 0.8 | 7 | 0.596 | 42.03 | 2.05 | 2.804 |
| 2 | 0.9 | 0.7 | 7 | 0.595 | 41.68 | 1.88 | 2.592 |
| 2 | 0.9 | 0.6 | 7 | 0.594 | 41.34 | 1.71 | 2.351 |
| 2 | 0.9 | 0.5 | 7 | 0.5937 | 41 | 1.66 | 1.909 |
| 2 | 0.8 | 1 | 3.5 | 0.5988 | 43.68 | 2.53 | 3.912 |
| 2 | 0.8 | 0.9 | 3.5 | 0.597 | 43.21 | 2.23 | 3.923 |
| 2 | 0.8 | 0.8 | 3.5 | 0.595 | 42.74 | 1.88 | 4.008 |
| 2 | 0.8 | 0.7 | 3.5 | 0.594 | 42.29 | 1.71 | 3.747 |
| 2 | 0.8 | 0.6 | 3.5 | 0.593 | 41.85 | 1.54 | 3.445 |
| 2 | 0.8 | 0.5 | 3.5 | 0.591 | 41.41 | 1.20 | 3.506 |
| 2 | 0.8 | 1 | 7 | 0.616 | 47.69 | 5.48 | 3.651 |
| 2 | 0.8 | 0.9 | 7 | 0.613 | 46.7 | 4.97 | 3.527 |
| 2 | 0.8 | 0.8 | 7 | 0.61 | 45.76 | 4.45 | 3.403 |
| 2 | 0.8 | 0.7 | 7 | 0.607 | 44.85 | 3.94 | 3.265 |
| 2 | 0.8 | 0.6 | 7 | 0.604 | 43.97 | 3.42 | 3.108 |
| 2 | 0.8 | 0.5 | 7 | 0.601 | 43.13 | 2.91 | 2.930 |
| 2 | 0.7 | 1 | 3.5 | 0.62 | 47.43 | 6.16 | 3.139 |
| 2 | 0.7 | 0.9 | 3.5 | 0.616 | 46.44 | 5.48 | 3.077 |
| 2 | 0.7 | 0.8 | 3.5 | 0.612 | 45.59 | 4.79 | 3.070 |

TABLE 2-continued

| Membrane layer Particle Size (microns) | Membrane Layer Porosity | Degree of Coverage | Membrane Layer thickness (microns) | Clean dP at 100 kg/hr at 450 C. (kPa) | Mass based FE for 0 g/L for 85 nm mean soot particle size | % dP Increase | $(FE_1 - FE_0)*P_0/(P_1 - P_0)/FE_0$ |
|---|---|---|---|---|---|---|---|
| 2 | 0.7 | 0.7 | 3.5 | 0.608 | 44.59 | 4.11 | 2.970 |
| 2 | 0.7 | 0.6 | 3.5 | 0.604 | 43.74 | 3.42 | 2.939 |
| 2 | 0.7 | 0.5 | 3.5 | 0.6 | 42.92 | 2.74 | 2.921 |
| 2 | 0.7 | 1 | 7 | 0.66 | 54.44 | 13.01 | 2.842 |
| 2 | 0.7 | 0.9 | 7 | 0.65 | 52.24 | 11.30 | 2.783 |
| 2 | 0.7 | 0.8 | 7 | 0.64 | 50.25 | 9.59 | 2.758 |
| 2 | 0.7 | 0.7 | 7 | 0.632 | 48.44 | 8.22 | 2.664 |
| 2 | 0.7 | 0.6 | 7 | 0.624 | 46.8 | 6.85 | 2.594 |
| 2 | 0.7 | 0.5 | 7 | 0.617 | 45.29 | 5.65 | 2.472 |
| 2 | 0.6 | 1 | 3.5 | 0.672 | 52.95 | 15.07 | 2.206 |
| 2 | 0.6 | 0.9 | 3.5 | 0.658 | 50.83 | 12.67 | 2.202 |
| 2 | 0.6 | 0.8 | 3.5 | 0.646 | 48.95 | 10.62 | 2.183 |
| 2 | 0.6 | 0.7 | 3.5 | 0.636 | 47.29 | 8.90 | 2.134 |
| 2 | 0.6 | 0.6 | 3.5 | 0.626 | 45.8 | 7.19 | 2.120 |
| 2 | 0.6 | 0.5 | 3.5 | 0.618 | 44.45 | 5.82 | 2.036 |
| 2 | 0.6 | 1 | 7 | 0.764 | 63.1 | 30.82 | 1.907 |
| 2 | 0.6 | 0.9 | 7 | 0.728 | 58.13 | 24.66 | 1.877 |
| 2 | 0.6 | 0.8 | 7 | 0.6989 | 54.21 | 19.67 | 1.851 |
| 2 | 0.6 | 0.7 | 7 | 0.675 | 51.03 | 15.58 | 1.823 |
| 2 | 0.6 | 0.6 | 7 | 0.656 | 48.41 | 12.33 | 1.770 |
| 2 | 0.6 | 0.5 | 7 | 0.639 | 46.21 | 9.42 | 1.729 |

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A honeycomb filter body comprising:
a porous ceramic honeycomb body comprising a first end, a second end, and a plurality of walls having wall surfaces defining a plurality of inner channels extending between the first end and the second end of the honeycomb body including one or more plugged channels, wherein the plurality of walls have an average thickness between 25 μm and 250 μm, the walls having a base wall portion comprised of a bulk portion having a bulk mean pore size of between 7 μm and 25 μm and a bulk porosity of between 50% and 70%, and wherein the porous ceramic honeycomb body has a base clean filter pressure drop ($P_0$) and a base clean filtration efficiency ($FE_0$); and
a porous inorganic layer disposed on one or more of the wall surfaces of the porous ceramic honeycomb body, wherein the porous inorganic layer has an average porosity (ε) greater than or equal to 50%, a mean particle size ($d_p$) less than or equal to 2 μm, and a thickness ($t_m$) between 0.5 μm and 30 μm;
wherein the honeycomb filter body has a clean filter pressure drop ($P_1$) and a clean filtration efficiency of ($FE_1$);
wherein an overall performance parameter of the honeycomb filter body has an overall performance parameter defined as "X", which according to Formula (I):

$$\frac{(FE_1 - FE_0)*P_0}{(P_1 - P_0)*FE_0} \quad \text{Formula (I)}$$

where $FE_1$ and $FE_0$ are mass based filtration efficiency parameters;
wherein the honeycomb filter body has a filtration performance defined as "F", which is according to Formula (II):

$$\frac{FE_1 - FE_0}{FE_0}; \quad \text{Formula (II)}$$

and
wherein X is greater than or equal to 1.75, and F is greater than or equal to 0.25.

2. The honeycomb filter body of claim 1, wherein X is greater than or equal to 2.

3. The honeycomb filter body of claim 1, wherein F is greater than or equal to 0.5.

4. The honeycomb filter body of claim 1, wherein F is greater than or equal to 1.25.

5. The honeycomb filter body of claim 1, wherein an axial distance of the honeycomb filter body spans from a first end to a second end of the honeycomb filter body, and the porous inorganic layer covers greater than or equal to 70% of the axial distance.

6. The honeycomb filter body of claim 5, wherein the porous inorganic layer covers greater than or equal to 80% of the axial distance.

7. The honeycomb filter body of claim 5, wherein the porous inorganic layer covers greater than or equal to 90% of the axial distance.

8. A honeycomb filter body comprising:
a porous ceramic honeycomb body comprising a first end, a second end, and a plurality of walls having wall surfaces defining a plurality of inner channels;
a porous inorganic layer disposed on one or more of the wall surfaces of the porous ceramic honeycomb body, wherein the porous inorganic layer has an average porosity (ε) greater than or equal to 95%, a mean particle size ($d_p$) in micrometers, and a thickness $t_m$;
wherein a morphology parameter of the porous inorganic layer is defined as "Y", which is according to Formula (IV):

$$\left(\varepsilon^{6.5/d_p^{0.5}}\right) * \left(\frac{1-\varepsilon}{d_p^{0.5}}\right); \quad \text{Formula (IV)}$$

and

Y is greater than or equal to 0.02.

9. The honeycomb filter body of claim 8, wherein Y is greater than or equal to 0.03.

10. The honeycomb filter body of claim 8, wherein Y is greater than or equal to 0.05.

11. The honeycomb filter body of claim 8, wherein the porous inorganic layer comprises a mean particle size ($d_p$) of less than or equal to 2 micrometers.

12. The honeycomb filter body of claim 11, wherein the mean particle size ($d_p$) is less than or equal to 1 micrometer.

13. The honeycomb filter body of claim 11, wherein the mean particle size ($d_p$) is less than or equal to 0.4 micrometers.

14. The honeycomb filter body of claim 8 further comprising a pressure drop performance is defined as "P", which is according to Formula (III):

$$\frac{P_1 - P_0}{P_0}; \quad \text{Formula (III)}$$

and

P is less than or equal to 0.25.

15. The honeycomb filter body of claim 14, wherein P is less than or equal to 0.20.

16. The honeycomb filter body of claim 14, wherein P is less than or equal to 0.05.

17. The honeycomb filter body of claim 8, wherein a thickness ($t_m$) of the porous inorganic layer is in the range of greater than or equal to 0.5 micrometers to less than or equal to 30 micrometers.

18. The honeycomb filter body of claim 8, comprising a plurality of plugged ends.

* * * * *